(12) United States Patent
Monk et al.

(10) Patent No.: US 8,621,539 B1
(45) Date of Patent: Dec. 31, 2013

(54) PHYSICAL LAYER TRANSMITTER FOR USE IN A BROADBAND LOCAL AREA NETWORK

(75) Inventors: Anton Monk, Del Mar, CA (US); Ron Porat, La Jolla, CA (US); Wee Peng Goh, Temecula, CA (US); Magnus Berggren, San Diego, CA (US); Ron Lee, San Diego, CA (US); Edward Warner, San Diego, CA (US); Brett Bernath, San Diego, CA (US); Yusuf Ozturk, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 1010 days.

(21) Appl. No.: 11/241,748

(22) Filed: Sep. 29, 2005

Related U.S. Application Data

(60) Provisional application No. 60/633,091, filed on Dec. 2, 2004, provisional application No. 60/632,797, filed on Dec. 2, 2004, provisional application No. 60/633,002, filed on Dec. 2, 2004, provisional application No. 60/632,856, filed on Dec. 2, 2004.

(51) Int. Cl.
*H04N 7/173* (2011.01)

(52) U.S. Cl.
USPC ............ 725/111; 725/123; 725/126; 725/127

(58) Field of Classification Search
None
See application file for complete search history.

(56) References Cited

U.S. PATENT DOCUMENTS

| | | | | |
|---|---|---|---|---|
| 5,923,653 A | * | 7/1999 | Denton | 370/375 |
| 6,005,939 A | * | 12/1999 | Fortenberry et al. | 705/76 |
| 6,052,380 A | * | 4/2000 | Bell | 370/445 |
| 6,085,248 A | * | 7/2000 | Sambamurthy et al. | 709/229 |
| 6,481,013 B1 | | 11/2002 | Dinwiddie et al. | |
| 6,522,650 B1 | * | 2/2003 | Yonge et al. | 370/390 |
| 7,302,700 B2 | * | 11/2007 | Mao et al. | 726/11 |
| 7,486,648 B1 | | 2/2009 | Baranowski | |
| 7,542,411 B1 | * | 6/2009 | Goh et al. | 370/208 |
| 2002/0059634 A1 | * | 5/2002 | Terry et al. | 725/111 |
| 2002/0071477 A1 | * | 6/2002 | Orava | 375/132 |
| 2002/0149705 A1 | | 10/2002 | Allen et al. | |
| 2002/0166124 A1 | * | 11/2002 | Gurantz et al. | 725/78 |
| 2002/0186797 A1 | * | 12/2002 | Robinson | 375/341 |
| 2003/0091067 A1 | | 5/2003 | Emerson et al. | |
| 2004/0081191 A1 | * | 4/2004 | Kwon et al. | 370/431 |
| 2004/0085894 A1 | * | 5/2004 | Wang et al. | 370/216 |
| 2004/0170157 A1 | * | 9/2004 | Kim et al. | 370/349 |
| 2004/0174841 A1 | | 9/2004 | Kubler | |
| 2004/0203472 A1 | * | 10/2004 | Chien | 455/68 |
| 2004/0218557 A1 | * | 11/2004 | Kim et al. | 370/312 |
| 2005/0120097 A1 | * | 6/2005 | Walton et al. | 709/220 |
| 2005/0185632 A1 | * | 8/2005 | Draves et al. | 370/351 |
| 2006/0221819 A1 | | 10/2006 | Padwekar | |
| 2007/0002878 A1 | * | 1/2007 | Moorti et al. | 370/401 |
| 2009/0217325 A1 | | 8/2009 | Kliger et al. | |

* cited by examiner

*Primary Examiner* — Cai Chen
(74) *Attorney, Agent, or Firm* — Bruce Greenhaus; Richard Bachand; Duane Morris LLP

(57) ABSTRACT

A physical layer transmitter that communicates between nodes in a broadband cable network by transmitting and receiving packets containing data and control information. Packets are constructed by the physical layer transmitter and transmitted to one or more receiving nodes that are capable of processing the packets. Packets are directed to specific nodes utilizing link layer control data. The packets may also contain control information that may include formatting, encoding and modulation parameters that are capable of being processed by the appropriate receiving nodes. The physical layer transmitter allows node-to-node communication within a broadband cable network and each node in the network is capable of communicating with every other node in the network.

7 Claims, 25 Drawing Sheets

| PHY Packet Type | Properties | Application |
|---|---|---|
| Probe | BPSK, no FEC | Error Vector Measurement (EVM)<br>IQ Imbalance correction<br>Echo Profile (EPP) |
| Robust | BPSK, redundant sub-carriers | Robust MAP<br>Beacon Packets<br>Contention and admission Packets |
| MAC Protocol Data Unit (MPDU) | Optimal modulation (bit-loaded) | MAP Packets<br>Data Packets<br>Link Control Packets |

Table 1 Three Packet Types Supported by the PHY Layer

FIG. 6

| SC# | bit # | SC# | bit # | SC# | bit # | SC# | bit # | SC# | bit # | SC# | bit # | SC# | bit # | SC# | bit # |
|---|---|---|---|---|---|---|---|---|---|---|---|---|---|---|---|
| 128 | 0 | 160 | 13 | 192 | 6 | 224 | 11 | 0 | 12 | 32 | 9 | 64 | 2 | 96 | 7 |
| 129 | 1 | 161 | 14 | 193 | 7 | 225 | 12 | 1 | 13 | 33 | 10 | 65 | 3 | 97 | 8 |
| 130 | 2 | 162 | 15 | 194 | 8 | 226 | 13 | 2 | 14 | 34 | 11 | 66 | 4 | 98 | 9 |
| 131 | 3 | 163 | 0 | 195 | 9 | 227 | 14 | 3 | 15 | 35 | 12 | 67 | 5 | 99 | 10 |
| 132 | 4 | 164 | 1 | 196 | 10 | 228 | 15 | 4 | 0 | 36 | 13 | 68 | 6 | 100 | 11 |
| 133 | 5 | 165 | 2 | 197 | 11 | 229 | 0 | 5 | 1 | 37 | 14 | 69 | 7 | 101 | 12 |
| 134 | 6 | 166 | 3 | 198 | 12 | 230 | 1 | 6 | 2 | 38 | 15 | 70 | 8 | 102 | 13 |
| 135 | 7 | 167 | 4 | 199 | 13 | 231 | 2 | 7 | 3 | 39 | 0 | 71 | 9 | 103 | 14 |
| 136 | 8 | 168 | 5 | 200 | 14 | 232 | 3 | 8 | 4 | 40 | 1 | 72 | 10 | 104 | 15 |
| 137 | 9 | 169 | 6 | 201 | 15 | 233 | 4 | 9 | 5 | 41 | 2 | 73 | 11 | 105 | 0 |
| 138 | 10 | 170 | 7 | 202 | 0 | 234 | 5 | 10 | 6 | 42 | 3 | 74 | 12 | 106 | 1 |
| 139 | 11 | 171 | 8 | 203 | 1 | 235 | 6 | 11 | 7 | 43 | 4 | 75 | 13 | 107 | 2 |
| 140 | 12 | 172 | 9 | 204 | 2 | 236 | 7 | 12 | 8 | 44 | 5 | 76 | 14 | 108 | 3 |
| 141 | 13 | 173 | 10 | 205 | 3 | 237 | 8 | 13 | 9 | 45 | 6 | 77 | 15 | 109 | 4 |
| 142 | 14 | 174 | 11 | 206 | 4 | 238 | 9 | 14 | 10 | 46 | 7 | 78 | 0 | 110 | 5 |
| 143 | 15 | 175 | 12 | 207 | 5 | 239 | 10 | 15 | 11 | 47 | 8 | 79 | 1 | 111 | 6 |
| 144 | 15 | 176 | 10 | 208 | 1 | 240 | 4 | 16 | 3 | 48 | 14 | 80 | 5 | 112 | 8 |
| 145 | 0 | 177 | 11 | 209 | 2 | 241 | 5 | 17 | 4 | 49 | 15 | 81 | 6 | 113 | 9 |
| 146 | 1 | 178 | 12 | 210 | 3 | 242 | 6 | 18 | 5 | 50 | 0 | 82 | 7 | 114 | 10 |
| 147 | 2 | 179 | 13 | 211 | 4 | 243 | 7 | 19 | 6 | 51 | 1 | 83 | 8 | 115 | 11 |
| 148 | 3 | 180 | 14 | 212 | 5 | 244 | 8 | 20 | 7 | 52 | 2 | 84 | 9 | 116 | 12 |
| 149 | 4 | 181 | 15 | 213 | 6 | 245 | 9 | 21 | 8 | 53 | 3 | 85 | 10 | 117 | 13 |
| 150 | 5 | 182 | 0 | 214 | 7 | 246 | 10 | 22 | 9 | 54 | 4 | 86 | 11 | 118 | 14 |
| 151 | 6 | 183 | 1 | 215 | 8 | 247 | 11 | 23 | 10 | 55 | 5 | 87 | 12 | 119 | 15 |
| 152 | 7 | 184 | 2 | 216 | 9 | 248 | 12 | 24 | 11 | 56 | 6 | 88 | 13 | 120 | 0 |
| 153 | 8 | 185 | 3 | 217 | 10 | 249 | 13 | 25 | 12 | 57 | 7 | 89 | 14 | 121 | 1 |
| 154 | 9 | 186 | 4 | 218 | 11 | 250 | 14 | 26 | 13 | 58 | 8 | 90 | 15 | 122 | 2 |
| 155 | 10 | 187 | 5 | 219 | 12 | 251 | 15 | 27 | 14 | 59 | 9 | 91 | 0 | 123 | 3 |
| 156 | 11 | 188 | 6 | 220 | 13 | 252 | 0 | 28 | 15 | 60 | 10 | 92 | 1 | 124 | 4 |
| 157 | 12 | 189 | 7 | 221 | 14 | 253 | 1 | 29 | 0 | 61 | 11 | 93 | 2 | 125 | 5 |
| 158 | 13 | 190 | 8 | 222 | 15 | 254 | 2 | 30 | 1 | 62 | 12 | 94 | 3 | 126 | 6 |
| 159 | 14 | 191 | 9 | 223 | 0 | 255 | 3 | 31 | 2 | 63 | 13 | 95 | 4 | 127 | 7 |

Table 2 Robust sub-carrier mapping

FIG. 7

Figure 8   Sub-Carrier Numbering

Data Scrambler with PN23

| Input bits | I-out | Q-out |
|---|---|---|
| 0 | 1 | 0 |
| 1 | -1 | 0 |

Table 3  BPSK Encoding Table

| Input bits | I-out | Q-out |
|---|---|---|
| 0 | 1 | 1 |
| 1 | -1 | 1 |
| 2 | 1 | -1 |
| 3 | -1 | -1 |

Table 4  QPSK Encoding Table

| Input bits | I-out | Q-out |
|---|---|---|
| 0 | -1 | -1 |
| 1 | 1 | -3 |
| 2 | -3 | 1 |
| 3 | -3 | -3 |
| 4 | 1 | 1 |
| 5 | 3 | -1 |
| 6 | -1 | 3 |
| 7 | 3 | 3 |

Table 5  8-QAM Encoding Table

FIG. 12

| Input bits | I-out | Q-out |
|---|---|---|
| 0 | 1 | 1 |
| 1 | 3 | 1 |
| 2 | 1 | 3 |
| 3 | 3 | 3 |
| 4 | -1 | 1 |
| 5 | -3 | 1 |
| 6 | -1 | 3 |
| 7 | -3 | 3 |
| 8 | 1 | -1 |
| 9 | 3 | -1 |
| 10 | 1 | -3 |
| 11 | 3 | -3 |
| 12 | -1 | -1 |
| 13 | -3 | -1 |
| 14 | -1 | -3 |
| 15 | -3 | -3 |

Table 6  16-QAM Encoding Table

FIG. 13

| Input bits | I-out | Q-out | Input bits | I-out | Q-out |
|---|---|---|---|---|---|
| 0 | 1 | 1 | 16 | 1 | -1 |
| 1 | 3 | 1 | 17 | 3 | -1 |
| 2 | 3 | 5 | 18 | 3 | -5 |
| 3 | 5 | 1 | 19 | 5 | -1 |
| 4 | 1 | 3 | 20 | 1 | -3 |
| 5 | 3 | 3 | 21 | 3 | -3 |
| 6 | 1 | 5 | 22 | 1 | -5 |
| 7 | 5 | 3 | 23 | 5 | -3 |
| 8 | -1 | 1 | 24 | -1 | -1 |
| 9 | -3 | 1 | 25 | -3 | -1 |
| 10 | -3 | 5 | 26 | -3 | -5 |
| 11 | -5 | 1 | 27 | -5 | -1 |
| 12 | -1 | 3 | 28 | -1 | -3 |
| 13 | -3 | 3 | 29 | -3 | -3 |
| 14 | -1 | 5 | 30 | -1 | -5 |
| 15 | -5 | 3 | 31 | -5 | -3 |

Table 7  32-QAM Encoding Table

FIG. 14

| Input bits | I-Out | Q-out | Input bits | I-Out | Q-Out |
|---|---|---|---|---|---|
| 0 | 1 | 1 | 32 | 1 | -1 |
| 1 | 3 | 1 | 33 | 3 | -1 |
| 2 | 7 | 1 | 34 | 7 | -1 |
| 3 | 5 | 1 | 35 | 5 | -1 |
| 4 | 1 | 3 | 36 | 1 | -3 |
| 5 | 3 | 3 | 37 | 3 | -3 |
| 6 | 7 | 3 | 38 | 7 | -3 |
| 7 | 5 | 3 | 39 | 5 | -3 |
| 8 | 1 | 7 | 40 | 1 | -7 |
| 9 | 3 | 7 | 41 | 3 | -7 |
| 10 | 7 | 7 | 42 | 7 | -7 |
| 11 | 5 | 7 | 43 | 5 | -7 |
| 12 | 1 | 5 | 44 | 1 | -5 |
| 13 | 3 | 5 | 45 | 3 | -5 |
| 14 | 7 | 5 | 46 | 7 | -5 |
| 15 | 5 | 5 | 47 | 5 | -5 |
| 16 | -1 | 1 | 48 | -1 | -1 |
| 17 | -3 | 1 | 49 | -3 | -1 |
| 18 | -7 | 1 | 50 | -7 | -1 |
| 19 | -5 | 1 | 51 | -5 | -1 |
| 20 | -1 | 3 | 52 | -1 | -3 |
| 21 | -3 | 3 | 53 | -3 | -3 |
| 22 | -7 | 3 | 54 | -7 | -3 |
| 23 | -5 | 3 | 55 | -5 | -3 |
| 24 | -1 | 7 | 56 | -1 | -7 |
| 25 | -3 | 7 | 57 | -3 | -7 |
| 26 | -7 | 7 | 58 | -7 | -7 |
| 27 | -5 | 7 | 59 | -5 | -7 |
| 28 | -1 | 5 | 60 | -1 | -5 |
| 29 | -3 | 5 | 61 | -3 | -5 |
| 30 | -7 | 5 | 62 | -7 | -5 |
| 31 | -5 | 5 | 63 | -5 | -5 |

Table 8  64-QAM Encoding Table

FIG. 15

| Input | I | Q | Input | I | Q | Input | I | Q | Input | I | Q |
|---|---|---|---|---|---|---|---|---|---|---|---|
| 0 | 1 | 1 | 32 | -1 | 1 | 64 | 1 | -1 | 96 | -1 | -1 |
| 1 | 3 | 1 | 33 | -3 | 1 | 65 | 3 | -1 | 97 | -3 | -1 |
| 2 | 7 | 1 | 34 | -7 | 1 | 66 | 7 | -1 | 98 | -7 | -1 |
| 3 | 5 | 1 | 35 | -5 | 1 | 67 | 5 | -1 | 99 | -5 | -1 |
| 4 | 7 | 9 | 36 | -7 | 9 | 68 | 7 | -9 | 100 | -7 | -9 |
| 5 | 5 | 9 | 37 | -5 | 9 | 69 | 5 | -9 | 101 | -5 | -9 |
| 6 | 9 | 1 | 38 | -9 | 1 | 70 | 9 | -1 | 102 | -9 | -1 |
| 7 | 11 | 1 | 39 | -11 | 1 | 71 | 11 | -1 | 103 | -11 | -1 |
| 8 | 1 | 3 | 40 | -1 | 3 | 72 | 1 | -3 | 104 | -1 | -3 |
| 9 | 3 | 3 | 41 | -3 | 3 | 73 | 3 | -3 | 105 | -3 | -3 |
| 10 | 7 | 3 | 42 | -7 | 3 | 74 | 7 | -3 | 106 | -7 | -3 |
| 11 | 5 | 3 | 43 | -5 | 3 | 75 | 5 | -3 | 107 | -5 | -3 |
| 12 | 7 | 11 | 44 | -7 | 11 | 76 | 7 | -11 | 108 | -7 | -11 |
| 13 | 5 | 11 | 45 | -5 | 11 | 77 | 5 | -11 | 109 | -5 | -11 |
| 14 | 9 | 3 | 46 | -9 | 3 | 78 | 9 | -3 | 110 | -9 | -3 |
| 15 | 11 | 3 | 47 | -11 | 3 | 79 | 11 | -3 | 111 | -11 | -3 |
| 16 | 1 | 7 | 48 | -1 | 7 | 80 | 1 | -7 | 112 | -1 | -7 |
| 17 | 3 | 7 | 49 | -3 | 7 | 81 | 3 | -7 | 113 | -3 | -7 |
| 18 | 7 | 7 | 50 | -7 | 7 | 82 | 7 | -7 | 114 | -7 | -7 |
| 19 | 5 | 7 | 51 | -5 | 7 | 83 | 5 | -7 | 115 | -5 | -7 |
| 20 | 1 | 9 | 52 | -1 | 9 | 84 | 1 | -9 | 116 | -1 | -9 |
| 21 | 3 | 9 | 53 | -3 | 9 | 85 | 3 | -9 | 117 | -3 | -9 |
| 22 | 9 | 7 | 54 | -9 | 7 | 86 | 9 | -7 | 118 | -9 | -7 |
| 23 | 11 | 7 | 55 | -11 | 7 | 87 | 11 | -7 | 119 | -11 | -7 |
| 24 | 1 | 5 | 56 | -1 | 5 | 88 | 1 | -5 | 120 | -1 | -5 |
| 25 | 3 | 5 | 57 | -3 | 5 | 89 | 3 | -5 | 121 | -3 | -5 |
| 26 | 7 | 5 | 58 | -7 | 5 | 90 | 7 | -5 | 122 | -7 | -5 |
| 27 | 5 | 5 | 59 | -5 | 5 | 91 | 5 | -5 | 123 | -5 | -5 |
| 28 | 1 | 11 | 60 | -1 | 11 | 92 | 1 | -11 | 124 | -1 | -11 |
| 29 | 3 | 11 | 61 | -3 | 11 | 93 | 3 | -11 | 125 | -3 | -11 |
| 30 | 9 | 5 | 62 | -9 | 5 | 94 | 9 | -5 | 126 | -9 | -5 |
| 31 | 11 | 5 | 63 | -11 | 5 | 95 | 11 | -5 | 127 | -11 | -5 |

Table 9  128-QAM Encoding Table

FIG. 16

| Input | I | Q | Input | I | Q | Input | I | Q | Input | I | Q |
|---|---|---|---|---|---|---|---|---|---|---|---|
| 0 | 1 | 1 | 64 | -1 | 1 | 128 | 1 | -1 | 192 | -1 | -1 |
| 1 | 3 | 1 | 65 | -3 | 1 | 129 | 3 | -1 | 193 | -3 | -1 |
| 2 | 7 | 1 | 66 | -7 | 1 | 130 | 7 | -1 | 194 | -7 | -1 |
| 3 | 5 | 1 | 67 | -5 | 1 | 131 | 5 | -1 | 195 | -5 | -1 |
| 4 | 15 | 1 | 68 | -15 | 1 | 132 | 15 | -1 | 196 | -15 | -1 |
| 5 | 13 | 1 | 69 | -13 | 1 | 133 | 13 | -1 | 197 | -13 | -1 |
| 6 | 9 | 1 | 70 | -9 | 1 | 134 | 9 | -1 | 198 | -9 | -1 |
| 7 | 11 | 1 | 71 | -11 | 1 | 135 | 11 | -1 | 199 | -11 | -1 |
| 8 | 1 | 3 | 72 | -1 | 3 | 136 | 1 | -3 | 200 | -1 | -3 |
| 9 | 3 | 3 | 73 | -3 | 3 | 137 | 3 | -3 | 201 | -3 | -3 |
| 10 | 7 | 3 | 74 | -7 | 3 | 138 | 7 | -3 | 202 | -7 | -3 |
| 11 | 5 | 3 | 75 | -5 | 3 | 139 | 5 | -3 | 203 | -5 | -3 |
| 12 | 15 | 3 | 76 | -15 | 3 | 140 | 15 | -3 | 204 | -15 | -3 |
| 13 | 13 | 3 | 77 | -13 | 3 | 141 | 13 | -3 | 205 | -13 | -3 |
| 14 | 9 | 3 | 78 | -9 | 3 | 142 | 9 | -3 | 206 | -9 | -3 |
| 15 | 11 | 3 | 79 | -11 | 3 | 143 | 11 | -3 | 207 | -11 | -3 |
| 16 | 1 | 7 | 80 | -1 | 7 | 144 | 1 | -7 | 208 | -1 | -7 |
| 17 | 3 | 7 | 81 | -3 | 7 | 145 | 3 | -7 | 209 | -3 | -7 |
| 18 | 7 | 7 | 82 | -7 | 7 | 146 | 7 | -7 | 210 | -7 | -7 |
| 19 | 5 | 7 | 83 | -5 | 7 | 147 | 5 | -7 | 211 | -5 | -7 |
| 20 | 15 | 7 | 84 | -15 | 7 | 148 | 15 | -7 | 212 | -15 | -7 |
| 21 | 13 | 7 | 85 | -13 | 7 | 149 | 13 | -7 | 213 | -13 | -7 |
| 22 | 9 | 7 | 86 | -9 | 7 | 150 | 9 | -7 | 214 | -9 | -7 |
| 23 | 11 | 7 | 87 | -11 | 7 | 151 | 11 | -7 | 215 | -11 | -7 |
| 24 | 1 | 5 | 88 | -1 | 5 | 152 | 1 | -5 | 216 | -1 | -5 |
| 25 | 3 | 5 | 89 | -3 | 5 | 153 | 3 | -5 | 217 | -3 | -5 |
| 26 | 7 | 5 | 90 | -7 | 5 | 154 | 7 | -5 | 218 | -7 | -5 |
| 27 | 5 | 5 | 91 | -5 | 5 | 155 | 5 | -5 | 219 | -5 | -5 |
| 28 | 15 | 5 | 92 | -15 | 5 | 156 | 15 | -5 | 220 | -15 | -5 |
| 29 | 13 | 5 | 93 | -13 | 5 | 157 | 13 | -5 | 221 | -13 | -5 |
| 30 | 9 | 5 | 94 | -9 | 5 | 158 | 9 | -5 | 222 | -9 | -5 |
| 31 | 11 | 5 | 95 | -11 | 5 | 159 | 11 | -5 | 223 | -11 | -5 |
| 32 | 1 | 15 | 96 | -1 | 15 | 160 | 1 | -15 | 224 | -1 | -15 |
| 33 | 3 | 15 | 97 | -3 | 15 | 161 | 3 | -15 | 225 | -3 | -15 |

Table 10 256-QAM Encoding Table

FIG. 17A

| 34 | 7 | 15 | 98 | -7 | 15 | 162 | 7 | -15 | 226 | -7 | -15 |
|---|---|---|---|---|---|---|---|---|---|---|---|
| 35 | 5 | 15 | 99 | -5 | 15 | 163 | 5 | -15 | 227 | -5 | -15 |
| 36 | 15 | 15 | 100 | -15 | 15 | 164 | 15 | -15 | 228 | -15 | -15 |
| 37 | 13 | 15 | 101 | -13 | 15 | 165 | 13 | -15 | 229 | -13 | -15 |
| 38 | 9 | 15 | 102 | -9 | 15 | 166 | 9 | -15 | 230 | 9 | 15 |
| 39 | 11 | 15 | 103 | -11 | 15 | 167 | 11 | -15 | 231 | 11 | 15 |
| 40 | 1 | 13 | 104 | -1 | 13 | 168 | 1 | -13 | 232 | 1 | 13 |
| 41 | 3 | 13 | 105 | -3 | 13 | 169 | 3 | -13 | 233 | 3 | 13 |
| 42 | 7 | 13 | 106 | -7 | 13 | 170 | 7 | -13 | 234 | 7 | 13 |
| 43 | 5 | 13 | 107 | -5 | 13 | 171 | 5 | -13 | 235 | 5 | 13 |
| 44 | 15 | 13 | 108 | -15 | 13 | 172 | 15 | -13 | 236 | 15 | 13 |
| 45 | 13 | 13 | 109 | -13 | 13 | 173 | 13 | -13 | 237 | 13 | 13 |
| 46 | 9 | 13 | 110 | -9 | 13 | 174 | 9 | -13 | 238 | 9 | 13 |
| 47 | 11 | 13 | 111 | -11 | 13 | 175 | 11 | -13 | 239 | 11 | 13 |
| 48 | 1 | 9 | 112 | -1 | 9 | 176 | 1 | -9 | 240 | 1 | 9 |
| 49 | 3 | 9 | 113 | -3 | 9 | 177 | 3 | -9 | 241 | 3 | 9 |
| 50 | 7 | 9 | 114 | -7 | 9 | 178 | 7 | -9 | 242 | 7 | 9 |
| 51 | 5 | 9 | 115 | -5 | 9 | 179 | 5 | -9 | 243 | 5 | 9 |
| 52 | 15 | 9 | 116 | -15 | 9 | 180 | 15 | -9 | 244 | 15 | 9 |
| 53 | 13 | 9 | 117 | -13 | 9 | 181 | 13 | -9 | 245 | 13 | 9 |
| 54 | 9 | 9 | 118 | -9 | 9 | 182 | 9 | -9 | 246 | 9 | 9 |
| 55 | 11 | 9 | 119 | -11 | 9 | 183 | 11 | -9 | 247 | 11 | 9 |
| 56 | 1 | 11 | 120 | -1 | 11 | 184 | 1 | -11 | 248 | 1 | 11 |
| 57 | 3 | 11 | 121 | -3 | 11 | 185 | 3 | -11 | 249 | 3 | 11 |
| 58 | 7 | 11 | 122 | -7 | 11 | 186 | 7 | -11 | 250 | 7 | 11 |
| 59 | 5 | 11 | 123 | -5 | 11 | 187 | 5 | -11 | 251 | 5 | 11 |
| 60 | 15 | 11 | 124 | -15 | 11 | 188 | 15 | -11 | 252 | 15 | 11 |
| 61 | 13 | 11 | 125 | -13 | 11 | 189 | 13 | -11 | 253 | 13 | 11 |
| 62 | 9 | 11 | 126 | -9 | 11 | 190 | 9 | -11 | 254 | 9 | 11 |
| 63 | 11 | 11 | 127 | -11 | 11 | 191 | 11 | -11 | 255 | 11 | 11 |

Table 10 (cont.) 256-QAM Encoding Table

FIG. 17B

| Modulation | $K_{MOD}$ |
|---|---|
| BPSK | 1 |
| QPSK | $1/\sqrt{2}$ |
| 8-QAM | $1/\sqrt{10}$ |
| 16-QAM | $1/\sqrt{10}$ |
| 32-QAM | $1/\sqrt{20}$ |
| 64-QAM | $1/\sqrt{42}$ |
| 128-QAM | $1/\sqrt{80}$ |
| 256-QAM | $1/\sqrt{170}$ |

Table 11  Modulation dependent normalization factor $K_{MOD}$

FIG. 18

PN15 used for Byte Scrambling

Cyclic Prefix Insertion Operation

Type I

| Short Training | Long Training |
|---|---|
| 0-8 | 256 samples |

Type II

| Long Training | Long Training |
|---|---|
| 0-8 | 512 samples |

Type III

| Short Training | Long Training | Fine Timing |
|---|---|---|
| 0-8 | 256 samples | 128 Samples |

Type IV

| Short Training | Long Training | Fine Timing |
|---|---|---|
| 0-8 | 512 samples | 128 Samples |

Type V

| Fine Timing |
|---|
| 64 Samples |

Preamble Type Structures

FIG. 21

| Packet type | Preamble + Channel Estimate | | | | Payload MPDU | | | | |
|---|---|---|---|---|---|---|---|---|---|
| | ST | LT | FT | CE | modulation | Sub-Carriers | Cyclic Prefix | Content | FEC |
| IQ probe | 8 | 8 | 0 | 1 | 16-QAM | 2 (specified by receiver of probe) | 0 | Specified by Packet Profile | NA |
| EVM Probe | 8 | 8 | 0 | 8 | BPSK | All except unused per table | 64 initially, 4-64 after EPP | PN15 | NA |
| EPP | 8 | 8 | 0 | 0 | BPSK | None, time domain signal | 0 | PN15 | NA |
| Robust | 8 | 8 | $[F_a, A]$ | 8 | BPSK | Table 2, FIG. 7, except unused per table | 64 | MAC link packets | k=192, T=8 |
| MPDU | 0-8 | 4 0 | Non [C] | 0,1,2, 4,8 | BPSK – QAM256 per bit-loading | Per bit-loading | 4-64 | MAC link & payload | First block k=192, T=8 Last block shortened |
| MAP MPDU | 0-8 | 0,4,8 | $[F_a, B]$ | 0,1,2, 4,8 | BPSK – QAM256 per bit-loading | Per bit-loading | 4-64 | MAC MAPs | Fixed as provided in a robust MAP |

Example Implementation of Communications System

FIG. 22

Zero-Order Hold and DAC Compensation

Low IF block diagram

PHYSICAL LAYER TRANSMITTER FOR USE IN A BROADBAND LOCAL AREA NETWORK

BACKGROUND OF THE INVENTION

1. Reference to Earlier-Filed Applications

This application claims priority under Section 119(e) to: (a) U.S. Provisional Application Ser. No. 60/633,091 titled "Physical Layer Transmitter for Use in a Broadband Local Area Network," filed Dec. 2, 2004; (b) U.S. Provisional Application Ser. No. 60/632,797 titled "A Broadband Local Area Network," filed Dec. 2, 2004; (c) U.S. Provisional Application Ser. No. 60/633,002 titled "Multiple Access Controller for a Broadband Coaxial Network," filed Dec. 2, 2004; and (d) U.S. Provisional Application Ser. No. 60/632,856 titled "Interface for a Broadband Coaxial Network," filed Dec. 2, 2004, all of which are incorporated herein, in their entirety, by this reference.

2. Field of Invention

The invention relates to broadband communication networks and in particular to broadband communication networks utilizing coaxial cable.

3. Related Art

The worldwide utilization of external television ("TV") antennas for receiving broadcast TV, and of cable television and satellite TV is growing at a rapid pace. These TV signals from an external TV antenna, cable TV and satellite TV, such as a direct broadcast satellite ("DBS") system, are usually received externally to a building (such as a home or an office) at a point-of-entry ("POE"). There may be multiple TV receivers and/or video monitors within the building and these multiple TV receivers may be in signal communication with the POE via a broadband cable network that may include a plurality of broadband cables and broadband cable splitters. Generally, these broadband cable splitters distribute downstream signals from the POE to various terminals (also known as "nodes") in the building. The nodes may be connected to various types of Customer Premise Equipment ("CPEs") such as cable converter boxes, televisions, video monitors, cable modems, cable phones and video game consoles.

Within a typical home, there may be a mixture of coaxial cables of varying quality, such as RG-59, RG-6, RG-6 quad shield, creating at times a less than optimal RF environment within the coaxial cables. Further, typical homes do little or no termination of cable outlets and that results in the introduction of RF interference into the coaxial cables in the form of signal reflections and ingress. Another problem often encountered with typical home coaxial cable configurations is that of multiple splitters of varying quality and frequency response characteristics, which may create a problem for signal distribution and at times limit the use of the coaxial network for local area networking, thus requiring a more controlled or higher quality cabling and at times, higher frequency ranges.

Typically, these broadband cables and broadband cable splitters are implemented utilizing coaxial cables and coaxial cable splitters, respectively. Additionally, in the case of cable TV or satellite TV, TV receivers with cable or satellite converter boxes, also known as set-top boxes ("STBs"), are connected between the TV receivers and the broadband cable network.

Typically, a STB connects to a coaxial cable from a network node (such as the wall outlet terminal) to receive cable TV and/or satellite TV signals. Usually, the STB receives the cable TV and/or satellite TV signals from the network node and converts them into TV signals that may be received by the TV receiver and/or video signals that may be received by a video monitor.

In FIG. 1, an example known broadband cable network 100 (also known as a "cable system" and/or "cable wiring") is shown within a building 102 (also known as customer premises or "CP") such as a typical home or office. The broadband cable system 100 may be in signal communication with an optional cable service provider 104, optional broadcast TV station 106, and/or optional DBS satellite 108, via signal path 110, signal path 112 and external antenna 114, and signal path 116 and DBS antenna 118, respectively. The broadband cable system 100 also may be in signal communication with optional CPEs such as STBs 120, 122 and 124, via signal paths 126, 128 and 130, respectively.

In FIG. 2, another example of a known broadband cable system is shown within a building (not shown) such as a typical home. The cable system 200 may be in signal communication with a cable provider (not shown), satellite TV dish (not shown), and/or external antenna (not shown) via a signal path 202 such as a main coaxial cable from the building to a cable connection (not shown) outside of the building. The cable system 200 may include a multi-tap device 204 which allows signal distribution to neighboring homes, a POE 210 to the home, N:1 Splitters 214, 222, 230, and 234, and Node Devices 228, 250, 252, 254, 256, 258, and 260.

Within the cable system 200, the Multi-Tap 204 may be in signal communication with the POE 210 via signal path 208. The POE 210 may be the connection point from the cable provider which is typically located external to the building of the cable system 200. The POE 210 may be implemented as a coaxial cable connector, transformer and/or filter.

The N:1 Splitter 214 acts as the main splitter (sometimes also called a Root Node) and may be in signal communication with N:1 Splitter 222, Node Device 228, and N:1 Splitter 230 via signal paths 216, 218 and 220, respectively. The N:1 Splitter 222 may be in signal communication with Node Devices 250, 252, and 254 via signal paths 224, 225 and 226, respectively. The N:1 Splitter 230 may be in signal communication with Node Device 260 and N:1 Splitter 234, via signal paths 240 and 232, respectively, and N:1 Splitter 234 in turn may be in signal communication with Node Devices 256 and 258 via signal paths 236 and 238, respectively. The N:1 Splitters 214, 222, 230 and 234 may be implemented as coaxial cable splitters. The Node Devices may be comprised of numerous well known STB units such as cable television set-top boxes and/or satellite television set-top boxes, as well as various video and multimedia devices typically found in the home or office. Typically, the signal paths 208, 212, 216, 218, 220, 224, 225, 226, 232, 236, 238, and 240 may be implemented utilizing coaxial cables.

In an example operation, the cable system 200 would receive CATV, and/or satellite radio frequency ("RF") TV signals 262 from the Multi-Tap 204 via signal path 208 at the POE 210. The POE 210 may pass, transform and/or filter the received RF signals to a second RF signal 264 that may be passed to N:1 Splitter (Root Node) 214 via signal path 212. The N:1 Splitter 214 may then split the second RF signal 264 into RF signals 230, 268 and 270. The RF signal 230 is then passed to N:1 Splitter 222 and the RF signals 272, 274 and 276 are passed to Node Devices 250, 252 and 254 via signal paths 224, 225 and 226, respectively. If the Node Device is a set-top box, the Node Device may convert the received RF signal into an RF signal such as Channels 3 and 4, or baseband signals such as Video and S-Video, or Components such as Y, Pr, Pb and Audio signals (not shown) that may be passed to a video monitor or a TV set (not shown) in signal communication with the set-top box.

In recent years, numerous consumer electronics appliances and software applications have been developed and continue to be developed. Thus, the numbers and types of CPEs that can be utilized in homes increase. These include television sets, video monitors, DVD players, Personal Computers ("PCs"), STBs, cable modems, cable phones, video game consoles, audio components, as well as various media units containing storage devices, such as Digital Video Recorders (DVRs) that are capable of storing various forms of multimedia information on a hard magnetic disk or optical drives for later retrieval and use by any device connected to it. Furthermore, there is a growing need for different CPEs to communicate with each other in the home and be able to share storage, display and other capabilities. As an example, users in a home may desire to simultaneously play network video games between different rooms in the home. Additionally, in another example, users in a home may want to share other types of digital data (such as video and/or computer information) between different devices in different rooms in a home.

Unfortunately, very few homes have home networks capable of providing the data rates and reliability required in order to allow video and audio networking within the home. Furthermore, most multimedia devices are not in the vicinity of the various home networking connection points, such as Ethernet or phone lines. For this reason, the existing coaxial cable within the home is a very attractive medium for providing such a networking functionality. The home coaxial cable has enormous amount of bandwidth available at frequencies not currently used by the cable TV services, it is a contained medium that mostly does not suffer external interference from other services such as the wireless medium, and most multimedia devices such as TV sets, STBs, DVRs, DVDs, and multimedia PCs are already connected to the home coaxial cable.

However, most broadband cable networks (such as the examples shown in both FIG. 1 and FIG. 2) presently utilized within most existing buildings are not configured to allow for easy networking between CPEs for several reasons: first, the devices that connect to the coaxial cable in the home are traditionally the Consumer Electronics (CE) and entertainment-related devices that have not traditionally been networked devices. This is about to change for the reasons stated above. The coaxial network is the ideal networking channel since these devices do not require any new connection since they are already connected to the coaxial network. Second, the coaxial network is already being used for TV distribution; hence one needs to ensure that utilizing it for networking does not impair existing services. Third, most broadband cable networks utilize cable splitters that are designed to split an incoming signal from the POE into numerous split signals that are passed to the different nodes in different rooms. These splitters have been designed to not allow or to minimize the signal transfer between output ports; thus the existing conventional wisdom is that the use of splitters in the existing broadband cable networks prevents networking between devices in the network because signals returning from the devices cannot be routed back through the splitters, i.e., cannot "jump" a splitter.

As an example, in a typical home the signal splitters are commonly coaxial cable splitters that have an input port and multiple output ports. Generally, the input port is known as a common port and the output ports are known as tap ports. These types of splitters are generally passive devices and may be constructed using lumped element circuits with discrete transformers, inductors, capacitors, and resistors and/or using strip-line or microstrip circuits. These types of splitters are generally bi-directional because they may also function as signal combiners, which sum the power from the multiple tap ports into a single output at the common port.

Presently many CPEs utilized in modern cable and DBS systems, however, have the ability to transmit as well as receive. If a CPE is capable of transmitting an upstream signal, the transmitted upstream signal from that CPE typically flows through the signal splitters back to the POE and to the cable and/or DBS provider. In this reverse flow direction, the signal splitters function as signal combiners for upstream signals from the CPEs to the POE. Usually, most of the energy from the upstream signals is passed from the CPEs to the POE because the splitters typically have a high level of isolation between the different connected terminals resulting in significant isolation between the various CPEs.

The isolation creates a difficult environment in which to network between the different CPEs because the isolation results in difficulty for transmitting two-way communication data between the different CPEs. Unfortunately, CPEs are becoming increasingly complex and a growing number of users desire to inter-connect these multiple CPEs into a network where one can share media and other functionality between connected devices.

Therefore, there is a need for a system and method to connect a variety of CPEs into a local network, such as a local area network ("LAN"), within a building such as a home or office, while utilizing an existing coaxial cable network within the building. Additionally, there is a need for the system and method to have the capability of allowing the user to incorporate a variety of newly-developed CPEs into the local network quickly and easily.

SUMMARY

A transmitter ("PHY Transmitter") for communicating between a plurality of nodes in a multi-media network communication system ("MNCS") utilizing a broadband cable network ("BCN") operating at the physical layer (Layer 1) within the ISO/OSI Network Model (or the Link layer of the TCP/IP Network Model) is disclosed. The PHY Transmitter provides the interface to the coaxial cable within the BCN, and performs all of the necessary RF, analog and digital processing required for transmitting MAC messages on the coaxial communications channel. The PHY Transmitter enables direct node to node communications over the coaxial channel within the BCN. The PHY Transmitter may be based on a Time Division Multiple Access (TDMA)/Time Division Duplex (TDD) scheme using multiple independent constellations and multi-carrier modulation. The PHY Transmitter may also include error correction coding, randomizing and modulation, preamble insertion, encryption and other functions under direction and control of an adjacent MAC Layer or Data Link Layer.

The PHY Transmitter may be implemented as a transmitting portion of each communicating node within the plurality of nodes where the PHY Transmitter is capable of constructing and transmitting a data signal to the plurality of nodes, with at least one receiving node within the plurality of nodes in signal communication with the transmitting node. The data signal may be constructed in the form of a block of modulated symbols called a "packet." The packets may consist of multiple types, with each type comprising multiple segments, containing various types of information dependent on the specific functionality the packet is required to perform. The at least one receiving node is capable of receiving and decoding the packet data signal and performing various functions in response to its decoding of the data signal. The at least one receiving node may also include a PHY Transmitter capable of constructing its own data signal and transmitting this data signal independently or in response to the received data signal.

In an example implementation, the PHY Transmitter, using data from a MAC layer, may be part of a logical mesh network whereby each node in the network is able to engage in two-way communications with every other node in the network. The PHY Transmitter may further be able to transmit a specific waveform to each node within the network, based on the link characteristics to that node, according to a process that may be controlled by a Network Coordinator ("NC") that is capable of resource management within the BCN.

As an example of operation, the PHY Transmitter is capable of transmitting several types of signals, including data packets, link control packets, probe packets and Beacon packets, within the BCN. For example, the PHY Transmitter may transmit a probe signal or several probe signals to a plurality of receiving nodes and receive a plurality of response signals from the corresponding receiving nodes of the plurality of receiving nodes, wherein each of the response signals includes a channel characterization of the link. This is accomplished by the receiving node analyzing the received signal and comparing it to an a priori known transmit signal format. The channel response information is then sent back to the transmitting node that can now change its transmission format to optimize the link communications to the channel response.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

FIG. 6 shows a table showing the packet types and their properties used in an example implementation of the PHY Transmitter of FIG. 5.

FIG. 7 shows a table showing the bit to sub-carrier mapping scheme used by the Robust packets of an example implementation of the PHY Transmitter of FIG. 5.

FIGS. 12, 13, 14, 15, 16, 17A and 17B show respectively, BPSK, QPSK, 8-QAM, 16-QAM, 32-QAM, 64-QAM, 128-QAM and 256-QAM Encoding Tables.

FIG. 18 shows a table containing the normalization factor $K_{MOD}$ for various modulation modes.

FIG. 21 shows a simplified block diagram of the structure of five possible preamble options used in a PHY packet constructed by an example implementation of a PHY Transmitter.

FIG. 22 shows a table that provides an example of a specific example implementation of a PHY transmitter.

DETAILED DESCRIPTION

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
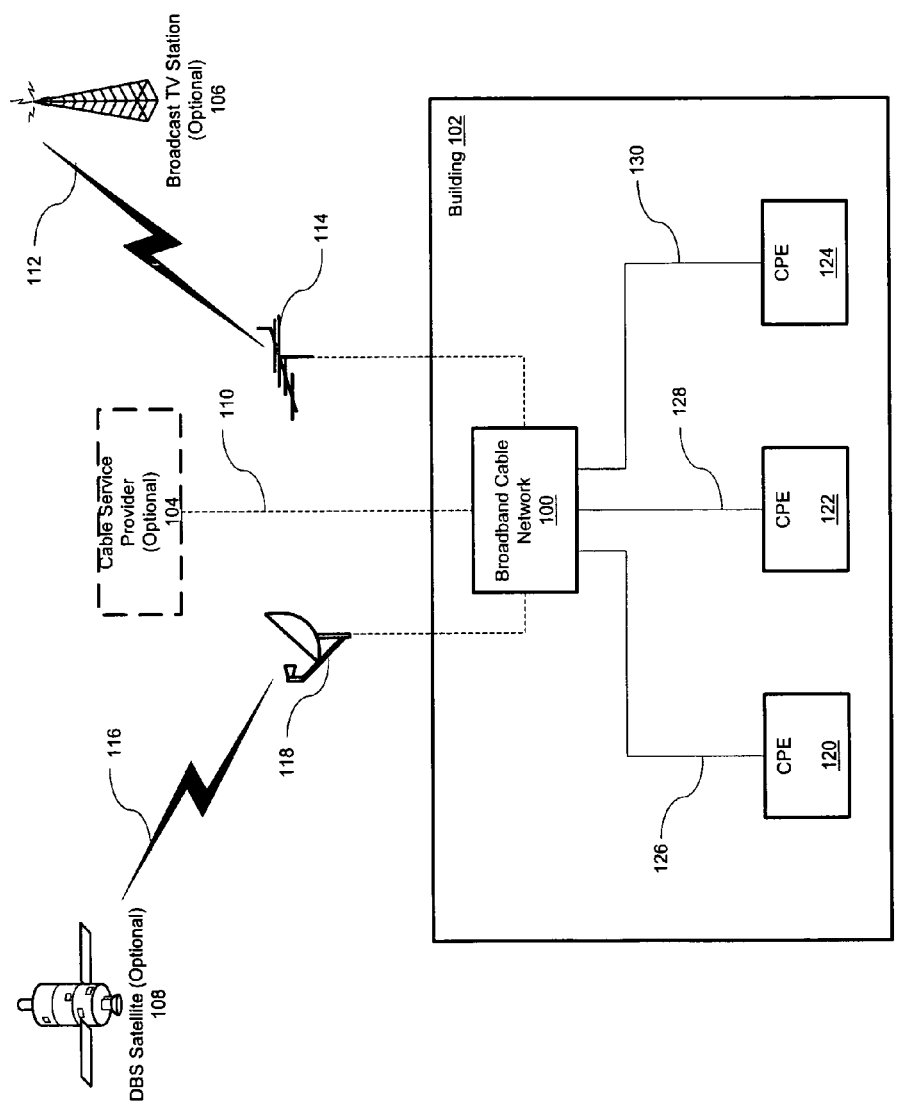
FIG. 1 shows a block diagram of an example implementation of a known broadband cable system within a building.
Figure 2:
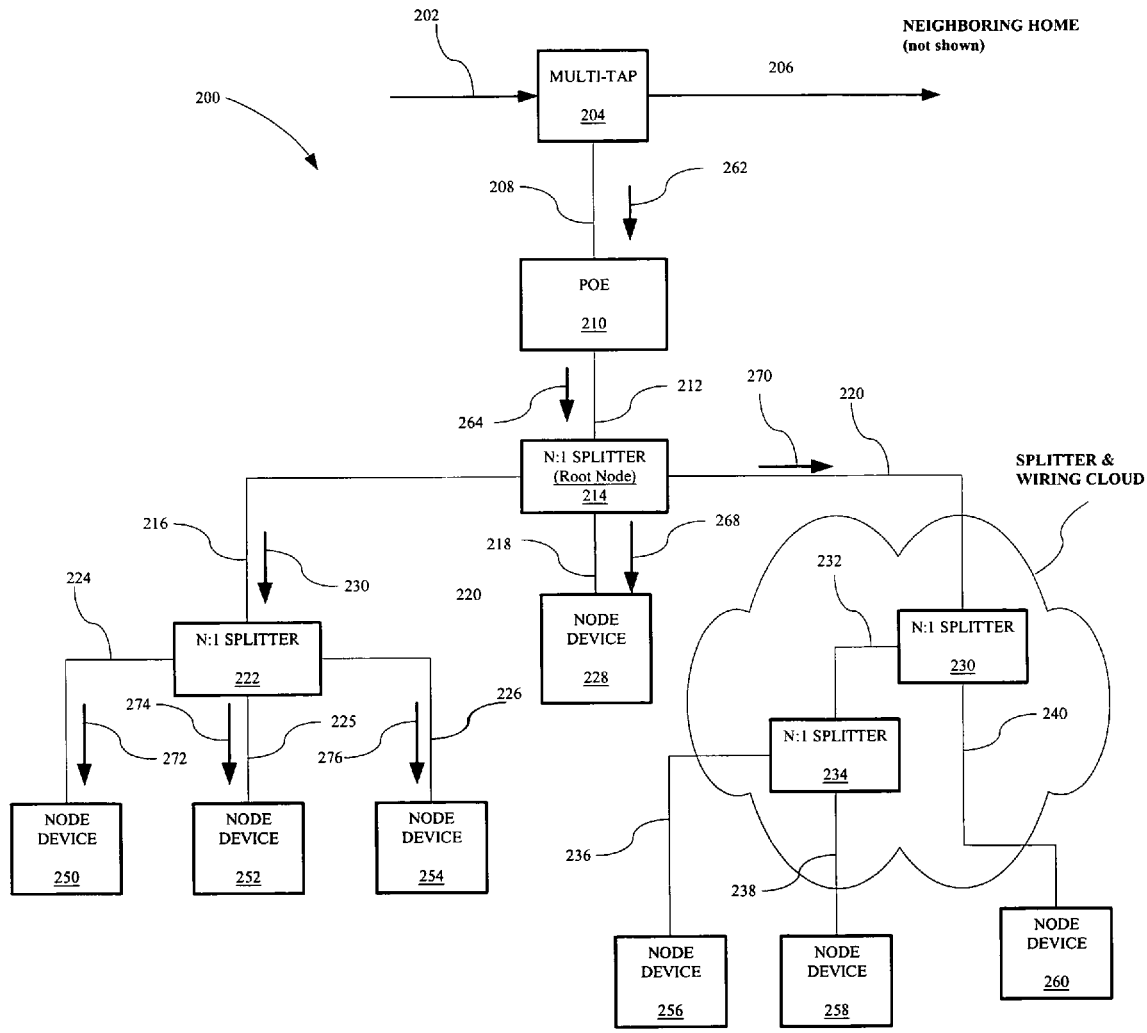
FIG. 2 shows a block diagram of another example implementation of a known broadband cable system within the building shown in FIG. 1.
Figure 3:
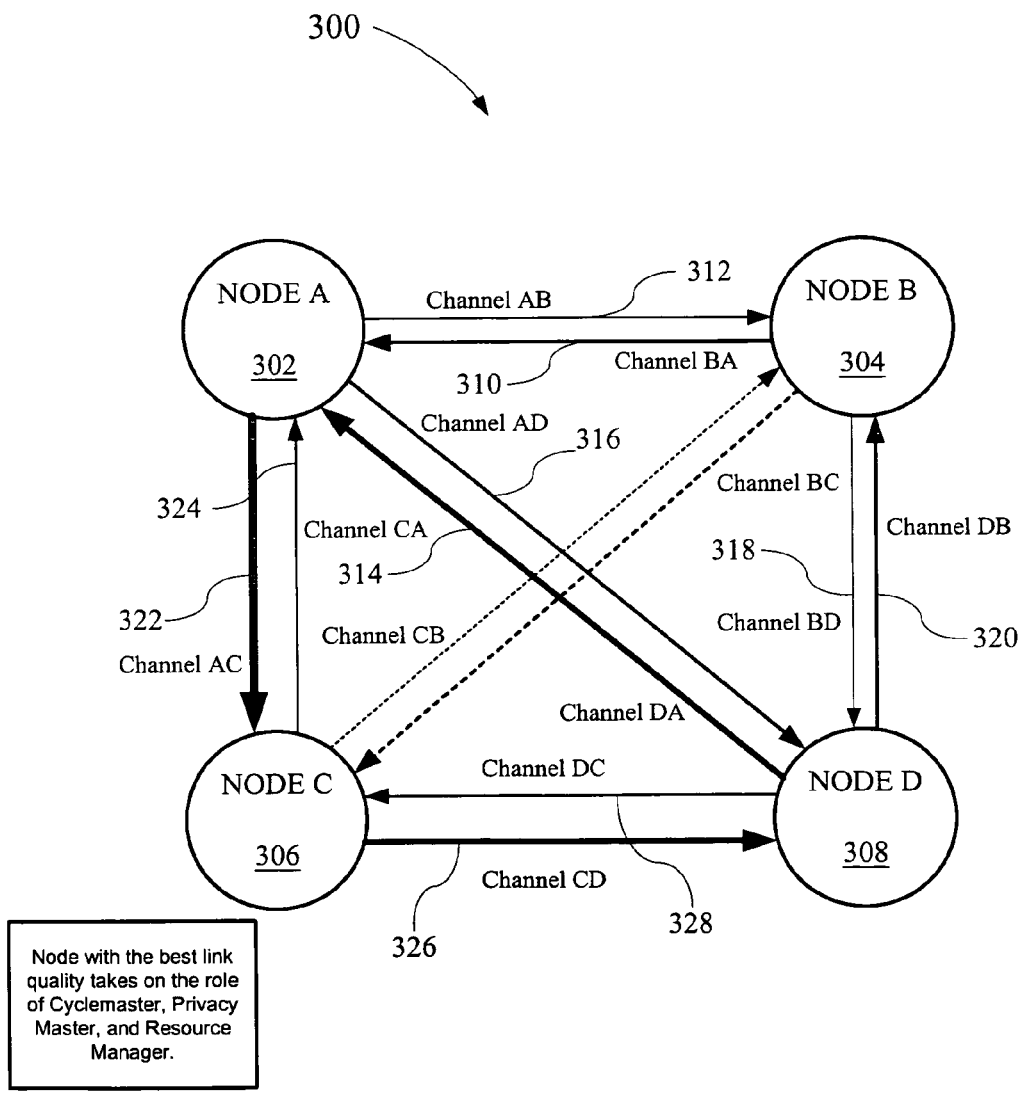
FIG. 3 shows a functional diagram showing the communication between the different nodes shown in the MNCS arranged in a virtual logical mesh network, and also the fact that the same link between two nodes may behave differently in different directions.

In FIG. 3, a functional diagram 300 showing the logical communications between various nodes of the coaxial home network, Node A 302, Node B 304, Node C 306, and Node D 308, in the form of a virtual logical mesh network is shown. Even though the coaxial network may utilize the same frequency for communications between the various nodes in the network, the frequency channel response between any pair of nodes and in any direction may be significantly different. Hence, to create the logical network shown in FIG. 3, there has to be concern about the communications capabilities between each and every node pair. Also, these communications capabilities should be optimized; otherwise the channel may be very poorly utilized. The principle reason for this is that since the network utilizes TDMA, if any of the links are of poor quality, it will take more of the network resources (time segments) to transmit a certain amount of information, and less time will be available for other transmissions on the network. It is therefore of utmost importance for the network to optimize each of the links in FIG. 3 in each direction, in order for the network to operate well.

The nodes 302, 304, 306 and 308 may be interconnected between node pairs utilizing corresponding inter-node communication channels between the node pairs as shown in FIG. 3. Therefore, inter-node channels between Node A 302, Node B 304, Node C 306 and Node D 308 may be asymmetric and thus utilize different modulation schemes depending on the direction of the signals between the node pairs. As a result, the typically asymmetric inter-node channels between Node A 302, Node B 304, Node C 306 and Node D 308 may be described by the corresponding direction-dependent node channels AB, BA, AC, CA, BC, CB, AD, DA, BD, DB, CD and DC.

As an example, node A 302 is in signal communication with node B 304 via signal paths 310 and 312. Signal path 312 corresponds to the AB channel direction and signal path 310 corresponds to the BA channel direction. Additionally, node A 302 is also in signal communication with node C 306 via signal paths 322 and 324. Signal path 322 corresponds to the AC channel and signal path 324 corresponds to the CA channel. Similarly, node A 302 is also in signal communication with node D 308 via signal paths 314 and 316. Signal path 316 corresponds to the AD channel and signal path 314 corresponds to the DA channel; the same applies for all other network node pairs.

In this example, the AB channel corresponds to the channel utilized by node A 302 transmitting to node B 304 along signal path 312. The BA channel corresponds to the reverse channel utilized by node B 304 transmitting to node A 302 along signal path 310.

In an example of operation, in order for node A 302 to transmit the same message to both node B 304 and node C 306 using the AB channel along signal path 312 and AC channel along signal path 322, node A 302 will need to transmit (i.e., "unicast") the same message twice, once to node B 304 and a second time to node C 306 because channel AB and channel AC may have a different channel response and the same physical transmission may not be appropriate for both transmissions. In order to minimize the requirement for sending the same information to multiple nodes in the network, resulting in a significant inefficiency, the proposed implementation may utilize a system by which probe messages between all nodes and in all directions are exchanged under the control of the corresponding MAC layers and under the supervision of a Network Controller ("NC"). These probe structures are known to both the transmitter and receiver; hence once a receiver receives a probe message, it can recognize the corresponding channel response by comparing the received waveform of the probe to the known transmitted waveform of the probe. Once this information is gained, the receiver can then inform the transmitter of the best modulation format to use for the specific channel. Since the coaxial network is relatively static in nature, and changes slowly, channel probing for link optimization is an infrequent requirement. Also, if a link performs poorly, an automatic channel response re-optimization ensues.

To enable the communications over the network during network admission and for the purpose of channel optimization and important control information, special types of packets, called Robust Packets, may be used. These packets can be transmitted and received reliably by every node in the network. Due to their construction, Robust Packets permit very reliable unicast and broadcast communications in the network. However, they are very inefficient and are used only for critical control functions, such as communications between nodes before channel optimization and for distributing network timing.

The network topology shown in FIG. 3 is a full-mesh peer-to-peer network. The PHY Transmitter may utilize other forms of network topology, which forms may include a partial-mesh network and a star network. In a partial-mesh network, the logical link between any two nodes in either direction may not be established for a variety of reasons including both network communications requirements and network optimization characteristics or others. In a star network, the optimized link scheme is established between a node device acting as the NC and each of the remaining nodes in the network and all communications in the network are through the NC. Another form of network topology may be a hybrid network that allows a combination of a star topology with selected peer-to-peer ("p-t-p") links, where the p-t-p is chosen based on several factors including network communications needs and/or optimizations of the available throughput; for example, only very high throughput links are accommodated for p-t-p links.

The above discussion shows the need for the PHY transmitter to be able to transmit three types of packets in the network: probe packets, robust packets and data packets. In general, these packet types accommodate all the packet types minimally necessary for network operations, although other packet types may also be implemented.

Figure 4:
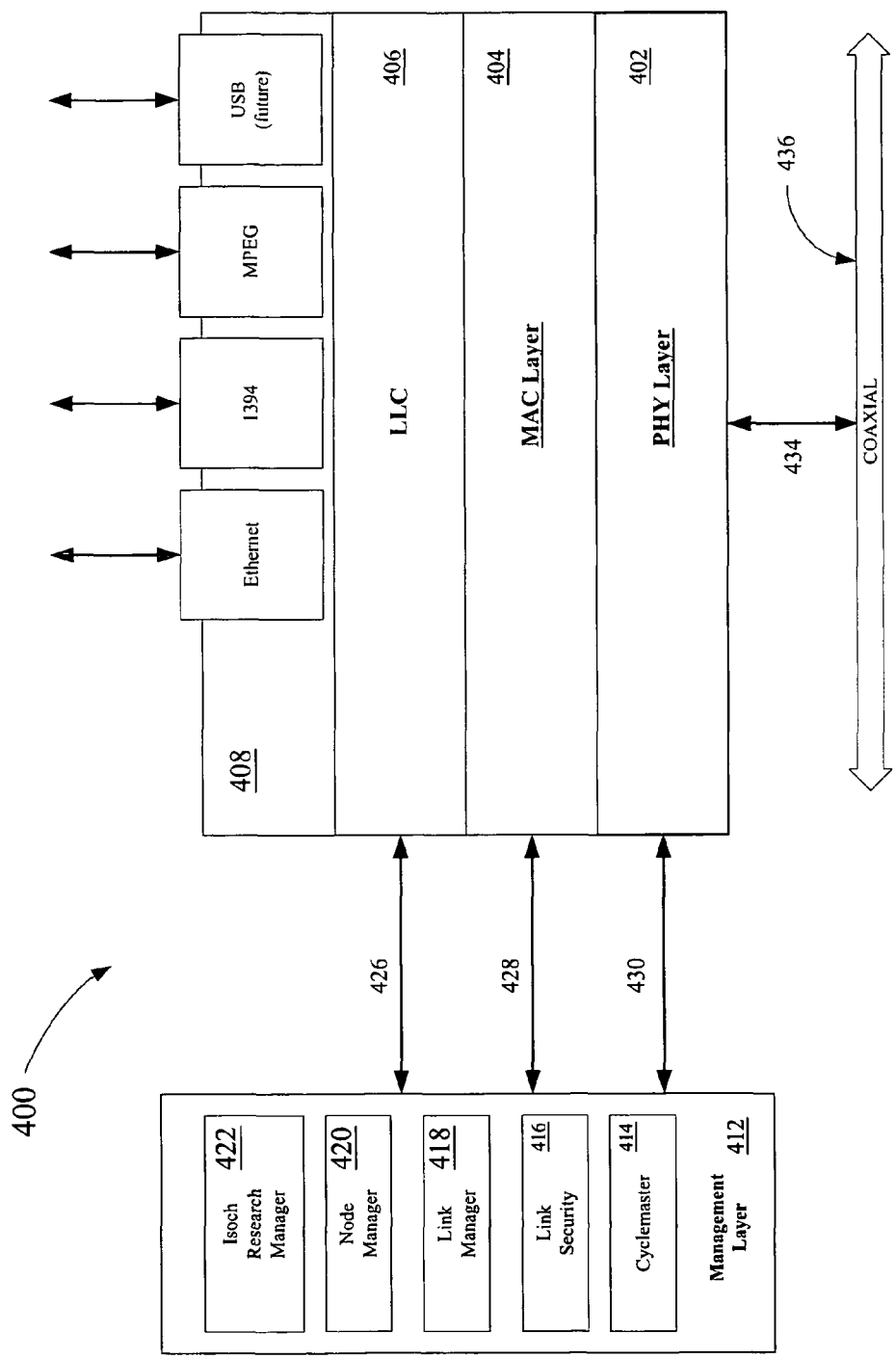
FIG. 4 shows a functional block diagram showing the communication protocol stack used in the communications layers above the PHY Transmitter used in the MCNS.

In FIG. 4, another functional diagram 400 showing the interfaces and functional relationships between the subsystems or layers of an example implementation of an MNCS communications network. FIG. 4 shows the communications protocol stack used in an example implementation of the network where the PHY Transmitter provides the transmit portion of the PHY Layer 402. In FIG. 4, PRY Layer 402 provides the interface to the coaxial cable 436 and performs all the necessary RF, analog and digital signal processing required in order to transmit and receive the MAC messages on the coaxial cable 436. The MAC Layer 404 is in communication with the PHY Layer 402 and the Link Layer Controller (LLC) 406. The MAC addresses and the associated internal control and messaging information are provided by a MAC transmitter (not shown) operating at the MAC Layer 404 (Layer 2). The MAC Layer 404 controls network resources to ensure that quality of service is met for each flow of data admitted to the BCN. The MAC Layer 404 also performs the function of maintaining the quality of connection with other nodes in the BCN, admissions into the network, requesting resource allocations, optimizing link throughput such as selecting the modulation scheme, election of the NC, encryption key handling, and other functions related to the management, communications, control and status of communications between the nodes in the BCN.

Another important element of the network is its ability to adapt existing communications protocols and services to the coaxial network. This is done by the adaptation layer 408 which maps communications protocols and services such as Ethernet, IEEE 1394, MPEG-TS, USB and others to map to the MNCS coaxial network protocol. So an isochronous service such as MPEG-TS can be mapped to the isochronous services provided by the MNCS coaxial network protocol ensuring the necessary minimal additional jitter and delay. Similarly, asynchronous Ethernet packets can flow through the coaxial network over the asynchronous or isochronous services of the MNCS.

Figure 5:
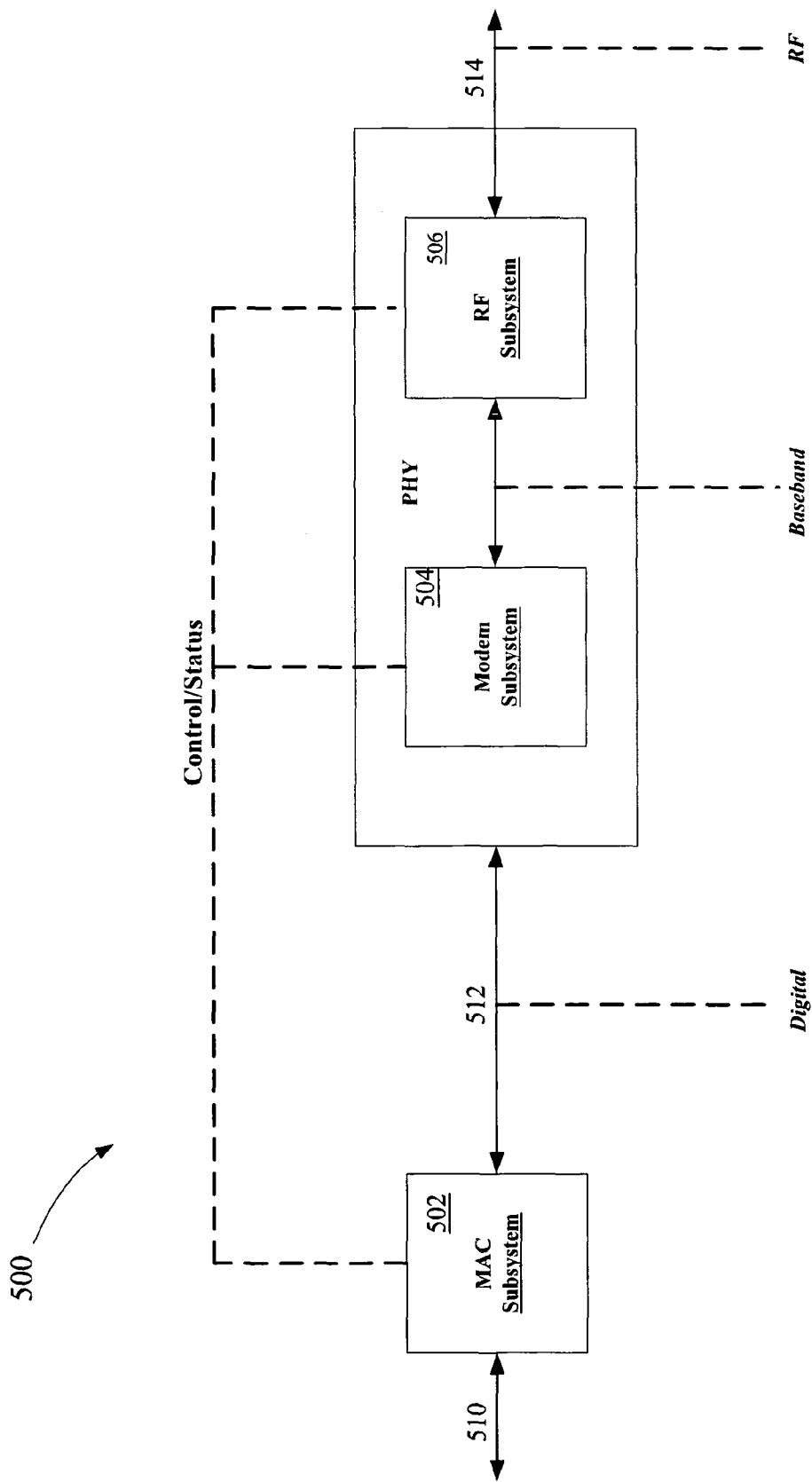
FIG. 5 shows a simplified block diagram of the three sub-systems of an example implementation of the PHY Transmitter.

In FIG. 5, a simplified block diagram of the major subsystems of an example implementation in which a PHY Transmitter is a part of the Modem Subsystem 504 is shown. In this example implementation, there are three major subsystems: (a) the MAC Subsystem 502; (b) the Modem Subsystem 504; and (c) the RF Subsystem 506. The MAC Subsystem 502 provides the interface between the user applications including the networking higher layers (not shown) and the Modem Subsystem 504 via communication path 510 and is the source and also the destination of network data and control information. The MAC Subsystem 502 constructs the data and control packets with media access control ("MAC") addresses and also the associated internal control and messaging information to be transmitted over the network to the Modem Subsystem 504 and the RF Subsystem 506 via Signal Path 512. The MAC Subsystem 502 may also perform Cyclic Redundancy Check ("CRC") encoding on all transmitted packets and CRC decoding on all received packets to ensure packet data integrity.

The Modem Subsystem 504 performs the formatting, encoding and modulation of the MAC packets received from the MAC Subsystem 502 and the demodulation, decoding and formatting of received packets from the RF Subsystem 506. The modulator section (not shown) accepts the MAC packets and the corresponding control information from the MAC Subsystem 502 and may perform forward error correction encoding, scrambling and DES encryption, and send the encoded information to the modulator (not shown).

The RF Subsystem 506 receives the modulated packets from the Modular Subsystem 504 via Signal Path 514 and up-converts the modulated packets to RF signals with a transmit frequency in accordance with the transmitted control information and amplifies the RF signal according to the desired power signal chosen by the transmitted control information. Both the transmit center frequency and the transmit power level may be adjusted according to predetermined values that allow both the shifting of the signals to another channel with a different modulation scheme and an adjustment in the power level that can be controlled on a packet by packet basis.

FIG. 6 shows a table that defines the three main packet types supported by the PHY Layer 402, FIG. 4, for both data transmission and PHY Layer calibration in an example implementation. It will be apparent to those of ordinary skill in the art that the packets used may be of various types, each with multiple formats; however, these three types have been chosen to illustrate the type of functions that may typically be performed by the PHY Transmitter, which is part of the Modem Subsystem 504, FIG. 5, in one possible embodiment, and are not meant to be exclusive of other possible formats and types.

As shown in Table 1, FIG. 6, there are three packet types defined. The first type is defined as a Probe Packet, the second as a Robust Packet, and the third as a MAC Protocol Data Unit ("MPDU") packet. Probe Packets are used for multiple functions; the main function has been discussed above and it is to probe the network and its frequency response for inter-node link throughput optimization. However, there are additional Probe Packets described in Table 1. In total, there are three types of probe packets that may be used for network link optimizations and PHY layer calibration and maintenance: (a) Error Vector Measurements ("EVM") Probes which are the channel response probes used for network frequency response and modulation optimization; (b) IQ Imbalance ("IQI") and Hardware/RF Optimization Probes whose purpose is to be able to reduce hardware complexity and compensate for certain hardware imperfections of filters, mixers, local oscillators, etc.; and (c) Echo Profile ("EP") Probes whose purpose is to measure node delay spread on the network in order to optimize the preamble and Cyclic Prefix ("CP") requirements or other parameters.

For example, it is appreciated by those skilled in the art that the different channels typically utilize different transmit pre-coding such as bit-loading with OFDM modulation schemes because the channels are physically and electrically different in the cable network. Physically the channels typically vary in length between nodes and electrically vary because of the paths through and reflections from the various cables, switches, terminals, connections and other electrical components in the cable network. A bit-loading scheme is described in U.S. Utility application Ser. No. 10/322,834 titled "Broadband Network for Coaxial Cable Using Multi-carrier Modulation," filed Dec. 18, 2002, which is incorporated herein, in its entirety, by reference.

The channel frequency response is computed for all inter-node channels between all nodes in the BCN. A node newly introduced into the BCN must complete the channel estimation process with all other nodes before it can send or receive data. The payload of the bit-loading probe, also denoted as the EVM probe, is specified by a Packet Profile.

Another example is the IQ Imbalance Probe Packet that is used to determine the IQ imbalance in the transmitter's and receiver's analog and RF sections. Recalibration is performed periodically, as scheduled by the MAC/link layer control ("LLC") with a typical period in the minutes. The payload of the IQ Imbalance Probe Packet consists of a pseudo random sequence (which need not be known to the receiver) that is transmitted on two or more OFDM sub-carriers. The modulation, the index of the sub-carriers used and the length of the cyclic prefix and the probe are determined by the intended receiver of the probe and are indicated to the transmitter of the probe by the MAC in a Packet Profile.

In another example, the EP probe is used to determine the impulse response of the inter-node channel. The result determines the size of the cyclic prefix of the OFDM waveform. The payload of the EP packet consists of n pseudo random time domain samples, generated by a pseudo random sequence. The payload is transmitted with a BPSK modulated single carrier at the center frequency of the channel. The length of the probe is provided by the MAC.

There are also three types of Robust Packets, used in multiple scenarios requiring highly robust acquisition and data transmission performance: (a) Beacon Packets, (b) Admission Packets, and (c) Robust Medium Access Plans ("MAPs"). The Beacon Packets are used by the NC to provide network timing and synchronization information. The synchronization information contained in the Beacon Packet includes pointers to the next Access Control Field ("ACF"), Asynchronous MAP, Isochronous MAP (if any), and the following Beacon packet. The Admission Packets are used when a node accesses the network the first time and include the initial contention mode packet and all the necessary information required by a new node.

Figure 8:
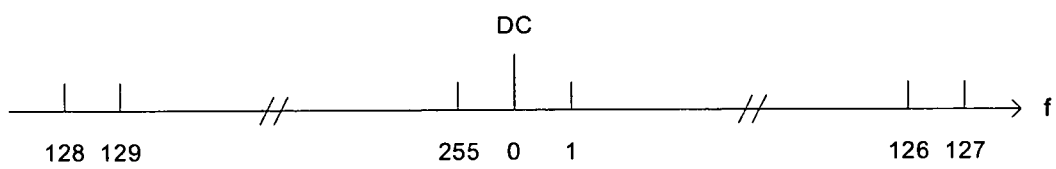
FIG. 8 shows a block diagram of the sub-carrier mapping locations of the OFDM modulation and the Table of FIG. 7. The Sub-Carriers numbers (SC#) in the table correspond to the Sub-Carrier locations of FIG. 8.

The Robust MAPs are used whenever the NC determines that the BCN needs a very robust means to provide information to all the nodes in the BCN and is used on networks whose performance is marginal or when the NC decides that it is better to make the network more robust at the expense of throughput. This could include isochronous MAPs, which require robust but less frequent updates (since the isochronous MAPs establish network circuits, they are required to be more robust but are not very frequent). The Robust Packets may utilize the lowest available modulation in use (BPSK) and the data is transmitted redundantly on multiple sub-carriers according to a known format. Each robust OFDM symbol transfers 2 bytes of data (16 bits) only. The Robust Packets use the bit to sub-carrier mapping shown in Table 2 shown in FIG. 7. Table 2 shows 16 bits, bit 0 through 15, and their sub-carrier locations. The sub-carrier locations in Table 2 are numbered from 0 to 255 and their actual locations in the OFDM are shown in FIG. 8. The repetitive nature of the bits contributes significantly to the robustness of the reception at the cost of efficiency. These packets, however, are used sparsely, so their reduced efficiency has minimal impact on network efficiency.

MPDU Packets may comprise MAP packets, Data packets, and Link Control packets. MAP Packets carry user MAC protocol data units. These packets can be unicast, multicast or broadcast as is defined in the MAP. The MPDU Packets are generally sent with optimized PHY parameters (both preamble and bit-loading). The optimized PHY parameters, determined by the LLC, depend on the destination node or nodes of the packet. The PHY layers of both the transmitter and the receiver obtain the PHY parameters and packet profile from their respective MAC layers.

Figure 9:
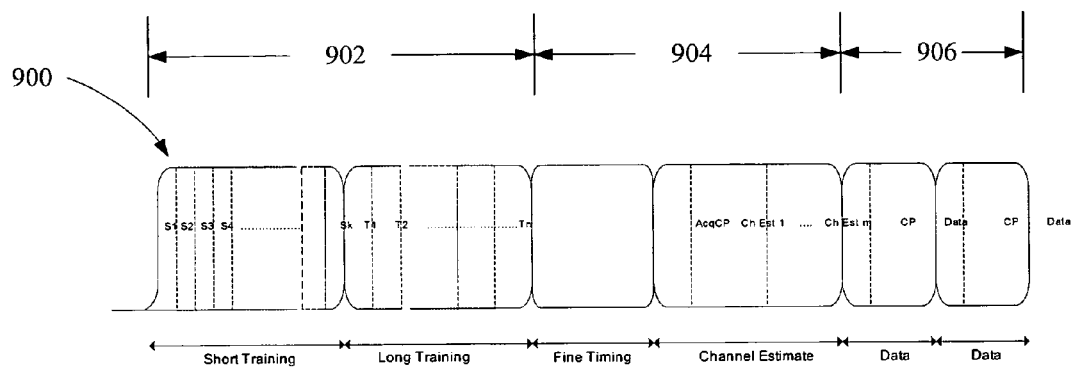
FIG. 9 shows a block diagram showing the general structure of a transmit packet used in an example implementation of a PHY Transmitter.

FIG. 9 shows a block diagram showing the general structure of a Transmit Packet 900 used in an example implementation of a PHY Transmitter. In this example implementation, the packets transmitted by the PHY Transmitter may include three main fields: (a) a preamble field 902, (b) a channel estimation field 904, and (c) a data field 906. Certain packets, such as probes, may include subsets of these three fields.

Figure 10:
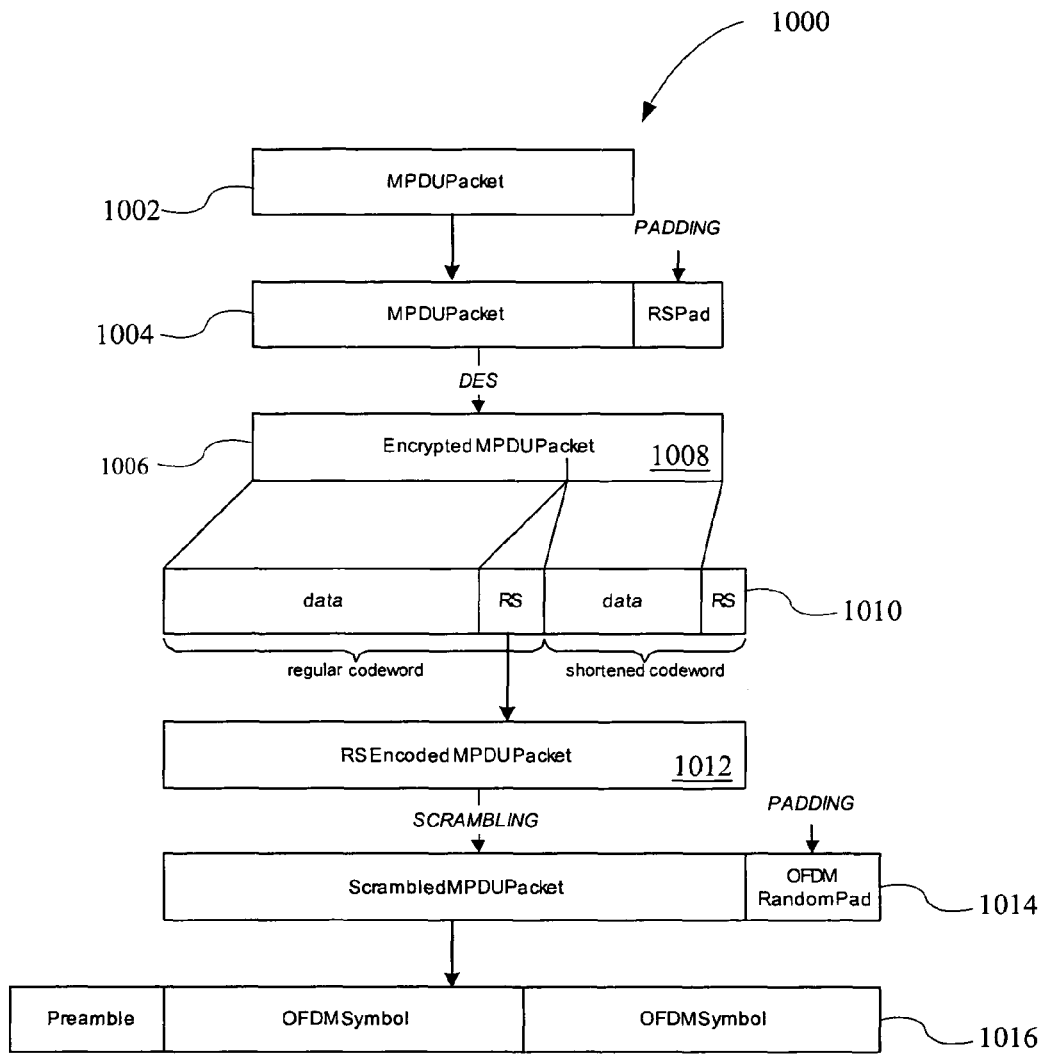
FIG. 10 shows a block diagram showing the steps in the construction of a PHY Transmit packet from the provided MAC Protocol DATA Unit ("MPDU") packet by an example implementation of a PHY Transmitter.

FIG. 10 shows a flow block diagram showing the construction of a MAC Protocol Data Unit ("MPDU") packet 1000 by an example implementation of a PHY Transmitter. The packet construction includes three major steps: (a) MPDU construction, (b) Preamble construction, and (c) Channel Estimate construction. These three segments form a packet for transmission to a node on the BCN.

In step 1002, the MPDU packet is provided by the MAC subsystem 502, FIG. 5, and already includes the various packet fields which are constructed by the MAC layer (not shown), including the packet header, timestamp, header CRC, payload and payload CRC structure. The MPDU data section contains an arbitrary number of bytes which are processed into the required number of OFDM symbols as described in greater detail below.

Next, in step 1004, the MPDU packet is first byte-padded with all '0' bytes, where the byte-padding takes into consideration both the Reed-Solomon (RS) encoding and its relation to an integral number of OFDM symbols. The PHY profile, provided by the MAC to the transmitter, defines among other things, the RS encoding parameters and the modulation and bit-loading profiles required to compute the required padding length. The modulator observes the MPDU length and computes the padding required in such a way that the total length of MPDU packet+padding+RS parity becomes an integral number of RS code words such that the last RS codeword is the largest among the possible last RS codeword defined below that can fit in the remainder bits of the OFDM symbols computed for the burst.

In step 1006, the packet is then encrypted using the Data Encryption Standard ("DES") algorithm (note that the padded packet size is an integral multiple of 8 bytes). The DES encryption is a system option to provide baseline privacy for all packets transmitted on the BCN. The MNCS may utilize a 56 bit DES encryption and may require the user to enter a password in order to be able to communicate in an encrypted network. The password is basically used to derive keys and authenticate nodes. Once a node is authenticated, it is admitted with no further requirements. All nodes with the same password form one virtual private network and nodes with different passwords will form separate virtual private networks on the same channel. Baseline privacy may be implemented using both static and dynamic keys for encryption. The static keys are used for authentication and initial key distribution while the dynamic keys are used for subsequent key distribution and data traffic. Generation and distribution of dynamic keys are controlled by a node designated as the Privacy Master ("PM") that may also be the NC.

In step 1010, the encrypted MPDU packet 1008 is then encoded with RS Forward Error Correction ("FEC") encoding. The RS FEC encoding encodes the encrypted data according to the parameters provided in the Packet Profile. The encoding encodes K bytes of encrypted data at a time by computing 2*T parity bytes with the primitive polynomial $G(256)=X^8+X^4+X^3+X^2+1$ and appending these parity bytes at the end of each RS frame to form N=K+2*T bytes codeword. The code is very flexible both in the selection of K (by shortening the code) and T. The most common coding parameters are K=192 and T=8. The last RS codeword is selected among the following: [K=128 T=6], [K=64 T=5], or [K=32 T=2]. Following the RS encoding, a final bit padding of all '0' is performed to ensure that the encoded MPDU fits into an integral numbers of bit-loaded, OFDM symbols.

The RS FEC encoded MPDU packet 1012 is then bit scrambled in step 1014 to further ensure a randomized bit stream prior to modulation. The randomization improves the spectral content of the transmission and reduces any data related DC biases. The RS FEC encoded MAC frame is randomized with a Pseudorandom Noise (PN23) sequence defined by the following references: a) "*Introduction to Spread Spectrum Communications,*" Roger L. Peterson, Rodger E. Zeimer and David E. Borth, Englewood Cliffs, N.J., Prentice Hall, 1995, and b) "*Error-correcting Codes,*" W. W. Peterson and E. J. Weldon, Cambridge. Mass, MIT Press, 1972, both of which are incorporated herein, in their entirety, by this reference. Then the resultant, randomized packet is padded to complete the final OFDM symbol with additional random bits as shown in step 1016. Finally in step 1018, a preamble is appended to the OFDM symbols to complete the packet construction.

Figure 11:
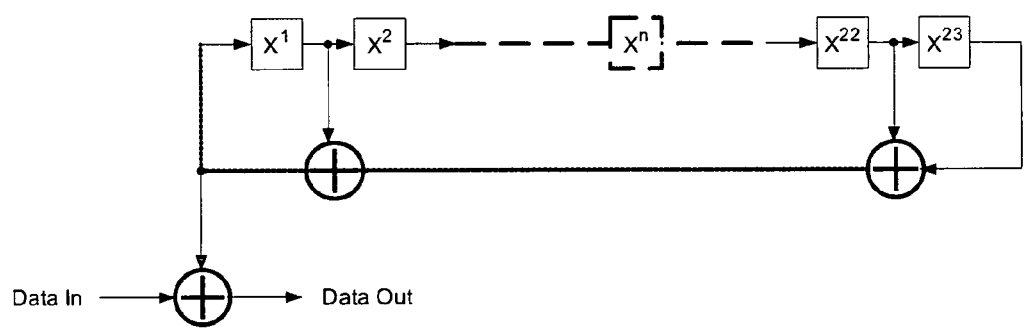
FIG. 11 shows a form and format for data scrambling by an example implementation of a PHY Transmitter.

FIG. 11 shows an example implementation of a randomizer that performs the bit scrambling. The bit scrambling is performed over the encoded and padded MPDU packet. The seed, which is the initial value loaded into the shift register in the figure, is sent to all the nodes in the network by the NC and is used for all packets within the corresponding network cycle. The seed for the MAP packet (which carries the seed information to all the network nodes) is known a priori by all the nodes in the network. The randomizer in the transmitter (and the receiver) is initialized with a seed at the beginning of each packet.

There is a second scrambling process that takes place following the carrier allocation process and just before the IFFT computation. This scrambling is called a "Byte Scrambling" and is described following the OFDM modulator section below.

The MPDU is now ready for modulation, which are basically OFDM sub-carrier mapping, Byte Scrambling, IFFT computation and Cyclic Prefix pre-pending. The sub-carrier numbering within the frequency band is shown in FIG. 8. The binary serial input data is mapped into the sub-carriers according to the bit-loading table provided by the Packet Profile and using 0 to 8 bits per sub-carrier with least-significant-bit first. The sub-carriers are being assigned sequentially starting with sub-carrier #0 to sub-carrier #255. Some of the sub-carriers may not be used due to the specific bit-loading table that may consider their respective frequencies to be of poor communications value. Similarly sub-carriers 128, 254, 255, 0, 1, 2, and 127 are typically not in use due to DC and channel edge considerations. Unused sub-carriers, defined by the bit-loading table, are still assigned a complex number of (0+j0), so every OFDM symbol is represented by 256 complex numbers.

The OFDM sub-carriers are modulated by using BPSK (2-QAM), QPSK (4-QAM), 8-QAM, 16-QAM, 32-QAM, 64-QAM, 128-QAM and 256-QAM constellations, depending on the bit-loading table provided to the modulator by the MAC sub-layer. Each sub-carrier data shall be converted into a complex number (HQ) representing the selected modulation constellation points. The conversion is performed according to the constellation mappings shown in Tables 3 through 10 shown in FIGS. 12, 13, 14, 15, 16, 17A and 17B. The binary number in the 'Input Bits' entry of the table is derived sequentially from the post scrambling MPDU with the least significant bit ("lsb") of the Input Bits entry aligned with the least significant bit of the first byte of the MPDU. Subsequent 'Input Bits' entries are taken from the next unused bits in the MPDU with the Input Bits lsb the first unused bits in the MPDU sequence, where the MPDU sequence is serialized by its byte entries, lsb first.

The output values, d, are formed by multiplying the resulting (HQ) value in Tables 3-10 by a normalization factor $K_{MOD}$, as described in the equation below:

$$d=(I+jQ) \times K_{MOD}$$

The normalization factor, $K_{MOD}$, depends on the modulation mode, as prescribed in Table 11 shown in FIG. 18. It should be noted that the modulation type can be different for each sub-carrier when bit-loading is used. The purpose of the normalization factor is to achieve the same average power for all mappings. In other implementations, an approximate value of the normalization factor may be used.

In Tables 3 through 10 shown in FIGS. 12, 13, 14, 15, 16, 17A and 17B, the Input Bits and the corresponding I-out and Q-out out of the modulator are provided. The input bits are represented by an integer whose binary representations are equivalent to the input bits. The number of bits is determined by the number of entries in the table. For example, the $5^{th}$ entry in Table 5, FIG. 12, is represented by the number 4 out of the 0-7 row entries. Therefore the number of input bits is 3 (represented by the numbers 0 to 7) and the input 100 (represented by the number 4) lead to I-out=1 and Q-out=1 for a (1+j1) modulator complex output.

Figure 19:
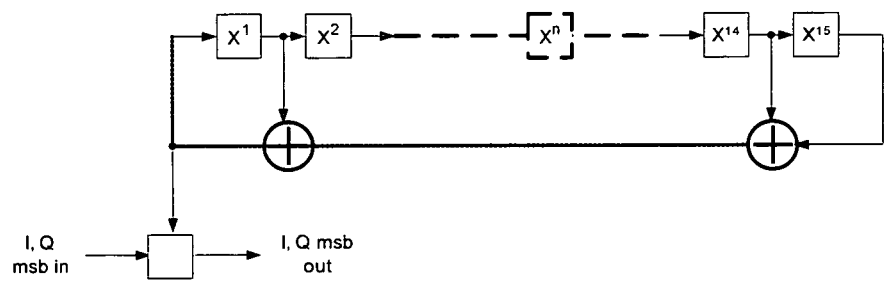
FIG. 19 shows a form and format for byte scrambling by an example implementation of a PHY Transmitter.

Following the OFDM sub-carrier mapping, the modulated carriers are scrambled again by a PN15 sequence shown in FIG. 19. Each of the constellation points for a modulated sub-carrier is inverted if the sequence bit is '0' and is not changed if the sequence bit is '1'. This is equivalent to inverting the sign of I and Q constellation for every '0' of the PN15 sequence. The resultant sequences are I and Q data of the modulated MPDU. The seed for the PN15 sequence is pre-determined for all the nodes in the network, but the Packet Profile can provide the disabling of the Byte Scrambling, as determined by the MAC.

There are no pilot sub-carriers, i.e., all utilized sub-carriers carry data. The stream of complex numbers generated by the Sub-Carrier Mapping and Byte Scrambling are converted to time domain samples by computing an Inverse Fast Fourier Transform (IFFT) on the block of 256 complex numbers $X[n]=(I_n+jQ_n)$ at the output of the Sub-Carrier Mapping/Byte Scrambling process. The operation is mathematically defined for N point frequency domain symbol of X[n] as follows:

$$x[k] = \frac{1}{N}\sum_{n=0}^{N-1} X[n]W_N^{-kn}, \quad 0 \le k \le N-1$$

$$x[k] = 0, \quad \text{otherwise}$$

$$W_N^{kn} = e^{-j2\pi kn/N}$$

with N=256 for the present implementation and n representing the sub-carrier number.

Figure 20:
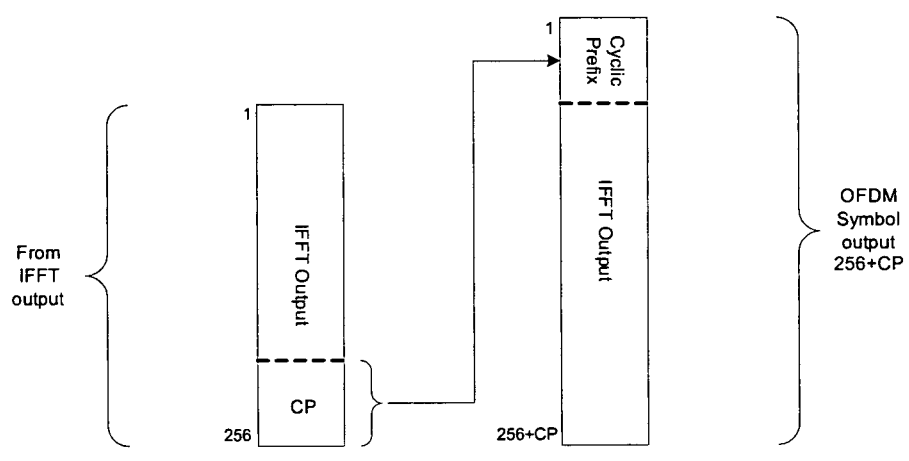
FIG. 20 shows a form and format for cyclic prefix insertion by an example implementation of a PHY Transmitter.

The cyclic prefix insertion is shown in FIG. 20. For each OFDM symbol (IFFT output), the last CP samples are copied and pre-pended to form one OFDM symbol. The cyclic prefix length is dependent on the multi-path delay spread in the cable system and is determined by the NC.

The second major step in packet construction is Preamble construction. In an example implementation, the preamble may be constructed of three optional segments; the Short Training (ST) segment, the Long Training (LT) segment and the Fine Timing (FT) segment. Following the preamble, the packet includes the optional channel estimate segment, described below, with its Cyclic Prefix, denoted as AcqCP. The MNCS may utilize five preamble types consisting of different combinations of the ST, LT and FT segments. When a programmable option is shown, the PHY transmitter will use the option provided by the MAC in the transmit packet profile descriptor.

FIG. 21 shows the structure of the five preamble options in an example implementation using the three optional segments. The components' three optional segments may be described in terms of time samples with a typical sample rate of 50 MHz (or 20 nsec sample to sample times) for this example implementation.

The Short Training ("ST") section contains between 0 and 8 identical S segments, denoted $S_1$-$S_k$ in FIG. 9. Each S segment contains 32 samples represented by complex numbers, normalized to a magnitude of 1, as follows:

$$S=\sqrt{(1/2)}\{1+j, -1-j, -1+j, -1+j, 1+j, 1-j, -1+j, -1+j,$$
$$-1-j, -1+j, 1-j, -1-j, -1+j, -1-j, -1-j, -1+j,$$
$$1+j, -1-j, -1+j, -1+j, 1+j, 1-j, -1+j, -1+j, -1-j,$$
$$-1+j, 1-j, -1-j, -1+j, -1-j, -1-j, -1+j\}$$

The short training preamble section signal can be generated from the S samples by the following equation:

$$y_{SHORT}(t) = \sum_{i=0}^{i=k}\left[\sum_{m=0}^{31} S_i(m) * \delta(t-j*m)\right]$$

where $y_{SHORT}(t)$ is the resultant waveform, and $S_i(m)$ is the $m^{th}$ element of the $i^{th}$ S sequence.

The Long Training ("LT") section contains 0, 2, 4, 6 or 8 T segments denoted $T_1$-$T_n$ in FIG. 9. Each T segment contains 64 samples represented by the following complex numbers:

$$T=\sqrt{(1/2)} \{1+j, 1+j, 1+j, -1+j, -1+j, -1-j, 1-j, -1+j,$$
$$1-j, 1+j, 1-j, 1+j, -1+j, -1-j, 1-j, -1+j, 1+j,$$
$$-1-j, -1+j, -1+j, 1-j, -1+j, -1+j, -1-j,$$
$$-1+j, 1-j, -1-j, -1+j, -1-j, -1-j, -1+j, 1+j, 1+j,$$
$$1+j, -1+j, -1+j, -1+j, 1-j, -1+j, 1-j, 1+j, 1-j,$$
$$1+j, -1+j, -1-j, 1-j, -1+j, 1+j, -1-j, -1+j, -1+j,$$
$$1+j, 1-j, -1+j, -1+j, -1+j, 1-j, -1-j, -1+j,$$
$$-1-j, -1-j, -1+j\}$$

The LT preamble section signal can be generated from the T samples according to the following equation:

$$y_{LONG}(t) = \sum_{j=0}^{j=n/2}\left[\sum_{m=0}^{63} T_j(m)*\delta(t-j*m)\right] - \sum_{j=n/2+1}^{n}\left[\sum_{m=0}^{63} T_j(m)*\delta(t-j*m)\right]$$

where $y_{LONG}(t)$ is the resultant waveform and $T_j(m)$ is the $m^{th}$ element of the $j^{th}$ T sequence.

A Fine Timing ("FT") section contains two segments of various combinations in different packets, as shown in FIG. 9. The sequence F is the concatenation of two segments as follows:

$$F=[F_a,F_b]$$

where $F_a$ and $F_b$ are each 64 samples long. In certain cases, such as for data MPDU, the sequence F is:

$$F=F_b$$

In such cases, the Fine Timing is only 64 samples long (as in the case of Preamble type V in FIG. 21).

$F_a=\sqrt{(½} \{1+j, -1-j, -1+j, -1+j, 1+j, 1-j, -1+j, -1+j,$
$-1-j, -1+j, 1-j, -1-j, -1+j, -1-j, -1-j, -1+j,$
$1+j, -1-j, -1+j, -1+j, 1+j, 1-j, -1+j, -1+j, -1-j,$
$-1+j, 1-j, -1-j, -1+j, -1-j, -1-j, -1+j, 0, 0, 0, 0,$
$0, 0, 0, 0, 0, 0, 0, 0, 0, 0, 0, 0, 0, 0, 0, 0, 0, 0, 0, 0,$
$0, 0, 0, 0, 0, 0, 0, 0\}$ $F_b$ is one of the 4 sequences A, B, C or D as follows:

$A=\sqrt{(½} \{+1+j, -1-j, -1-j, -1-j, -1-j, -1-j, +1+j,$
$+1+j, -1-j, +1+j, +1+j, +1+j, -1-j, -1-j, +1+j,$
$+1+j, -1-j, -1-j, -1-j, +1+j, +1+j, +1+j, -1-j,$
$+1+j, -1-j, +1+j, +1+j, +1-j+1+j, +1+j, +1+j,$
$-1-j, 1-j, +1+j, +1+j, -1-j, +1+j, -1-j, -1-j,$
$-1-j, +1+j, -1-j, -1-j, -1-j, -1-j, +1+j, -1-j,$
$+1+j, +1+j, -1-j, -1-j, +1+j, -1-j, +1+j, -1-j,$
$+1+j, -1-j, -1-j, +1+j, -1-j, -1-j, +1+j, +1+j,$
$+1+j\}$ $B=\sqrt{(½} \{+1+j, -1-j, +1+j, +1+j, -1-j, -1-j, -1-j,$
$+1+j, -1-j, -1-j, +1+j, -1-j, -1-j, -1-j, -1-j, -1-j,$
$+1+j, +1+j, -1-j, -1-j, -1-j, -1-j, +1+j, -1-j,$
$+1+j, +1+j, +1+j, +1+j, +1+j, +1+j, -1-j, -1-j,$
$-1-j, +1+j, -1-j, +1+j, -1-j, +1+j, +1+j, -1-j, -1-j,$
$-1-j, +1+j, +1+j, -1-j, -1-j, +1+j, +1+j, +1+j,$
$+1+j, -1-j, +1+j, +1+j, +1+j, -1-j, +1+j, -1-j,$
$+1+j, +1+j, -1-j, +1+j, -1-j, -1-j, +1+j\}$ $C=\sqrt{(½} \{+1+j, +1+j, -1-j, +1+j, +1+j, -1-j, +1+j,$
$+1+j, -1-j, +1+j, -1-j, -1-j, +1+j, -1-j, -1-j,$
$+1+j, +1+j, +1+j, -1-j, -1-j, -1-j, +1+j, -1-j,$
$+1+j, +1+j, +1+j, +1+j, -1-j, -1-j, +1+j, -1-j,$
$-1-j, +1+j, -1-j, -1-j, -1-j, +1+j, +1+j, -1-j,$
$-1-j, -1-j, -1-j, +1+j, -1-j, -1-j, -1-j, +1+j, -1-j,$
$-1-j, +1+j, +1+j, +1+j, +1+j, +1+j, +1+j, -1-j,$
$+1+j, -1-j, +1+j, -1-j, +1+j, +1+j, -1-j, -1-j\}$ $D=\sqrt{(½} \{-1-j, +1+j, +1+j, +1+j, -1-j, +1+j, +1+j,$
$-1-j, +1+j, -1-j, -1-j, +1+j, -1-j, -1-j, +1+j,$
$+1+j, +1+j, -1-j, -1-j, -1-j, +1+j, -1-j, +1+j,$
$+1+j, +1+j, +1+j, -1-j, -1-j, +1+j, -1-j, +1+j,$
$-1-j, -1-j, -1-j, -1-j, +1+j, +1+j, -1-j, -1-j,$
$-1-j, -1-j, +1+j, -1-j, -1-j, -1-j, -1-j, -1-j,$
$-1-j, +1+j, +1+j, +1+j, +1+j, +1+j, +1+j, -1-j,$
$+1+j, -1-j, +1+j, -1-j, +1+j, +1+j, -1-j, -1-j,$
$+1+j, +1+j\}$ The FT symbol is generated according to the following equation:

$$y_{FINE}(t) = \sum_{m=1}^{128} F(m)*\delta(t-j*m)$$

When 64 samples are being used, as in preamble type V FIG. 21, only the last sequence are being 64 samples of the f used.

The third major step in packet construction is Channel Estimation ("CE") construction (see FIGS. 9 and 22). The Channel Estimate section consists of a variable length (0-256 samples) cyclic prefix, denoted as AcqCP, followed by 0 to 8 OFDM symbols. The AcqCP is a cyclic prefix of the first symbol only and is used if there is at least one OFDM symbol. If there is more than one OFDM symbol in the CE, any additional OFDM symbols in the CE do not have a cyclic prefix. The Channel Estimate OFDM symbols consist of 256 sub-carriers, where the DC sub-carrier is removed. The sub-carriers are modulated according to the L sequence below:

$L(-128, 128)=\{1, 1, -1, -1, 1, 1, -1, 1, -1, 1, 1, 1, 1,$
$1, 1, -1, -1, 1, 1, -1, 1, -1, 1, 1, 1, 1, \ldots 0(DC),$
$\ldots 1, -1, -1, 1, 1, -1, 1, -1, 1, -1, -1, -1, -1,$
$-1, 1, 1, -1, -1, 1, -1, 1, -1, 1, 1, 1, 1\}$ FIG. 22 shows an example of a specific implementation of a communications system utilizing a PHY transmitter, in the form of a table summarizing the various PHY packet types that may be implemented, together with some of their more important example parameters.

Figure 23:
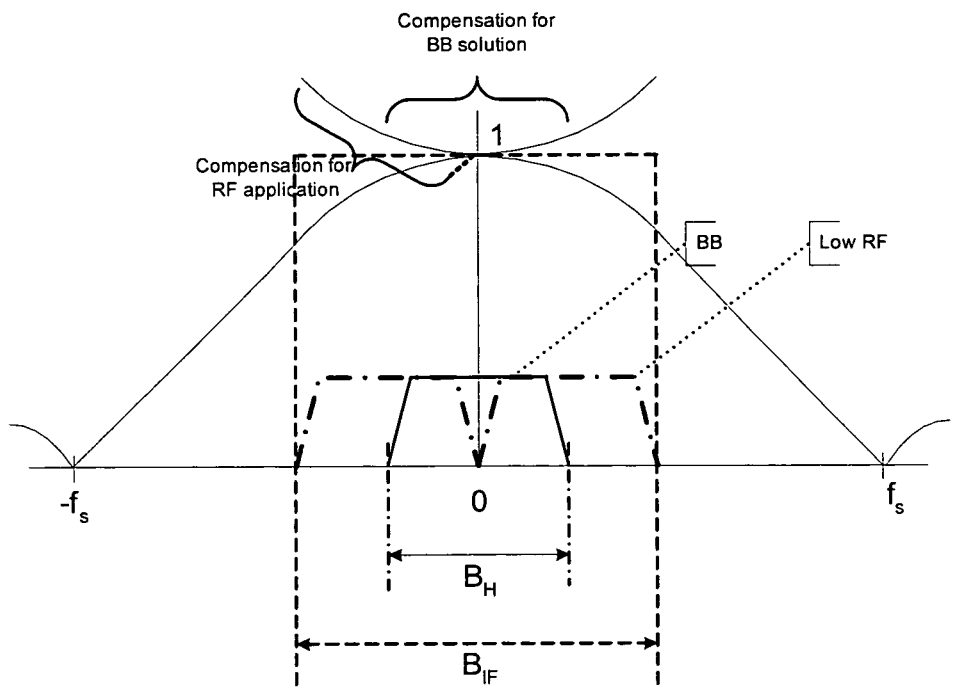
FIG. 23 shows a diagram of the zero-order hold and DAC compensation found in an example implementation of a PHY transmitter.

For each packet, the modulator section of the Modem Sub-system 504, FIG. 5, prepends the selected preamble according to the control information and performs filtering and DAC compensation signal processing before sending the information to the dual Digital to Analog converters for conversion to analog baseband signals to be baseband transmitted or passed to the RF sub-system for upconversion and RF transmission. Due to the zero-order hold effect of the Digital to Analog conversion ("DAC"), the DAC process may introduce a distortion to the signal spectrum. The frequency response of the zero-hold DAC is as shown in FIG. 23. Due to this well known response, the system can pre-distort the signal in the digital domain in order to compensate for the DAC effects. Since the system may operate in baseband mode or in RF mode, 2 sets of compensation coefficients are required.

Prior to up-conversion by the RF Subsystem 506, FIG. 5, I and Q signals may be corrected to compensate for the transmitter I and Q imbalance. Direct conversion implementations of the RF transmit chain may cause impairments that manifest themselves as a difference between I branch and the Q branch. The link control layer, as part of the admission process, initiates the IQ imbalance probes. The results are used by the node to correct (i.e., pre-distort) its imbalance. The I and Q imbalance manifests itself in the time domain as gain, phase and delay difference between the I arm and the Q arm of the RF portion of the transmitter and receiver. In the frequency domain, the gain and phase imbalances manifest themselves as a negative frequency image, i.e., any information transmitted on a certain frequency shows up attenuated on the image. The delay imbalance manifests itself as a negative frequency image the value of which depends on the frequency. A possible algorithm describing the receive and transmit imbalance may output three values for the transmitter and three for the receiver.

The complex I and Q OFDM signals are up-converted to form a real signal at the desired center frequency. The output filter is responsible to match the RF signal to the cable impedance and to the specified spectral mask around the central frequency.

Figure 24:
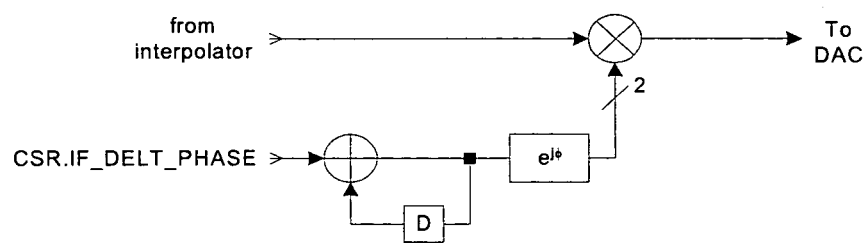
FIG. 24 shows the form and format for the low IF operation performed by an example implementation of a PHY Transmitter.

In certain applications, the frequencies below 50 MHz may be made available for use by the communications system. In these applications, the system will not require the use of up-conversion to RF frequencies and can output the signal directly out of the DAC and output filter (with a potential addition of amplifications and additional filtering). This method of operation is called a "low IF" operation and is shown in FIG. 24. Consecutive samples from the output of the system prior to the DAC interface are rotated by an amount to provide digital up-conversion to low IF frequency. This value is loaded into the appropriate register by the system software. The rotation is accomplished using a direct digital rotation or by the use of the Cordic algorithm. When operating in the low IF, the DAC compensation coefficient has to be re-adjusted to match the frequency response of the sample-hold effect on the DAC.

The processes shown in FIGS. 10, 11, 19, 20, 23 and 24 may be performed by hardware or software. If the process is performed by software, the software may reside in software memory (not shown) in the BCN. The software in software memory may include an ordered listing of executable instructions for implementing logical functions (i.e., "logic" that may be implemented either in digital form such as digital circuitry or source code or in analog form such as analog circuitry or an analog source such as an analog electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples, that is "a non-exhaustive list" of the computer-readable media, would include the following: an electrical connection (electronic) having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

While various embodiments of the invention have been described, it will be apparent to those of ordinary skill in the art that many more embodiments and implementations are possible that are within the scope of this invention.

What is claimed is:

1. A modem for communication to at least one node across at least one channel of a coaxial network, the modem comprising:
   a transmitter; and
   a MAC layer in signal communication with the transmitter, the MAC layer using at least one probe packet as an echo profile probe to measure node delay spread on the network and the MAC layer optimizing the preamble and cyclic prefix requirements or other parameters in response to the measured node delay spread on the network;
   wherein the transmitter communicates the at least one transmit packet.

2. The modem of claim 1 wherein the one probe packet has a payload, and the payload includes pseudo random time domain samples generated by a pseudo random sequence.

3. The modem of claim 2 wherein the payload is transmitted with a binary phase shift keying (BPSK) modulated single carrier at the center frequency of the channel.

4. The modem of claim 3 wherein a length of the one probe packet is provided by the MAC layer.

5. The modem of claim 1 wherein the one probe packet has a payload, and the payload consists of pseudo random time domain samples generated by a pseudo random sequence.

6. The modem of claim 5 wherein the payload is transmitted with a binary phase shift keying (BPSK) modulated single carrier at the center frequency of the channel.

7. The modem of claim 6 wherein a length of the one probe packet is provided by the MAC layer.

* * * * *

UNITED STATES PATENT AND TRADEMARK OFFICE
CERTIFICATE OF CORRECTION

| | | |
|---|---|---|
| PATENT NO. | : 8,621,539 B1 | Page 1 of 1 |
| APPLICATION NO. | : 11/241748 | |
| DATED | : December 31, 2013 | |
| INVENTOR(S) | : Monk et al. | |

It is certified that error appears in the above-identified patent and that said Letters Patent is hereby corrected as shown below:

In the Claims

Claim 1, line 25, change "transmit" to --probe--.

Signed and Sealed this
Tenth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,621,539 B1  
APPLICATION NO. : 11/241748  
DATED : December 31, 2013  
INVENTOR(S) : Monk et al.

Page 1 of 1

It is certified that error appears in the above-identified patent and that said Letters Patent is hereby corrected as shown below:

In the Claims

Column 18, Claim 1, line 25, change "transmit" to --probe--.

This certificate supersedes the Certificate of Correction issued June 10, 2014.

Signed and Sealed this
Fifteenth Day of July, 2014

Michelle K. Lee
*Deputy Director of the United States Patent and Trademark Office*